(12) United States Patent
Pallamsetty

(10) Patent No.: US 11,303,814 B2
(45) Date of Patent: Apr. 12, 2022

(54) SYSTEMS AND METHODS FOR CONTROLLING A FIELD OF VIEW

(71) Applicant: QUALCOMM Incorporated, San Diego, CA (US)

(72) Inventor: Venkata Rajesh Pallamsetty, Kurnool (IN)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 15/807,954

(22) Filed: Nov. 9, 2017

(65) Prior Publication Data

US 2019/0141252 A1    May 9, 2019

(51) Int. Cl.
*H04N 5/232*        (2006.01)
*G06F 3/01*         (2006.01)
*G06F 1/16*         (2006.01)

(52) U.S. Cl.
CPC ......... *H04N 5/23296* (2013.01); *G06F 1/163* (2013.01); *G06F 3/011* (2013.01); *G06F 3/017* (2013.01); *H04N 5/23238* (2013.01); *H04N 5/23293* (2013.01)

(58) Field of Classification Search
CPC ......... H04N 2013/0085; H04N 12/111; H04N 12/122; H04N 12/002; H04N 12/322; H04N 2213/002; H04N 2213/00
See application file for complete search history.

(56) References Cited

U.S. PATENT DOCUMENTS

| 9,741,169 B1* | 8/2017 | Holz ..................... G06F 3/011 |
| 10,110,814 B1* | 10/2018 | Day ..................... G06T 3/0018 |
| 10,182,210 B1* | 1/2019 | Goetzinger, Jr. ........ H04N 7/15 |
| 2007/0002131 A1 | 1/2007 | Ritchey |
| 2010/0097580 A1* | 4/2010 | Yamamoto .......... G02B 26/101 353/69 |
| 2010/0113153 A1* | 5/2010 | Yen ......................... A63F 13/06 463/37 |
| 2011/0276652 A1* | 11/2011 | Mukherjee ............. H04N 19/37 709/217 |
| 2011/0293129 A1* | 12/2011 | Dillen ..................... H04S 7/304 381/370 |
| 2013/0007668 A1* | 1/2013 | Liu ......................... G06F 3/012 715/841 |
| 2014/0002329 A1* | 1/2014 | Nishimaki ........... G06K 7/1404 345/8 |
| 2014/0098186 A1 | 4/2014 | Seidl et al. |
| 2014/0118357 A1* | 5/2014 | Covington ........... H04N 13/344 345/473 |

(Continued)

FOREIGN PATENT DOCUMENTS

WO    2016102763 A1    6/2016

*Primary Examiner* — Jefferey F Harold
*Assistant Examiner* — Timothy R Newlin
(74) *Attorney, Agent, or Firm* — Qualcomm Incorporated

(57) ABSTRACT

A method performed by an electronic device is described. The method includes receiving surround view image content. The method also includes orienting a first field of view (FOV) of the surround view image content relative to a coordinate system of the surround view image content. The method further includes receiving a reorientation input. The method additionally includes determining a reorientation factor based on the reorientation input. The method also includes reorienting the first FOV to a second FOV of the surround view image content relative to the coordinate system based on the reorientation factor. The method further includes presenting the second FOV.

31 Claims, 14 Drawing Sheets

(56) References Cited

U.S. PATENT DOCUMENTS

| | | | |
|---|---|---|---|
| 2014/0192024 A1* | 7/2014 | Holz | H04N 5/23241 |
| | | | 345/175 |
| 2015/0288877 A1* | 10/2015 | Glazer | A61B 5/1114 |
| | | | 348/77 |
| 2016/0210784 A1 | 7/2016 | Ramsby et al. | |
| 2016/0266386 A1* | 9/2016 | Scott | G06F 3/013 |
| 2017/0083084 A1* | 3/2017 | Tatsuta | G06F 3/0346 |
| 2017/0092235 A1* | 3/2017 | Osman | G06F 3/013 |
| 2017/0118458 A1* | 4/2017 | Gronholm | H04N 13/156 |
| 2017/0153866 A1* | 6/2017 | Grinberg | G02B 27/017 |
| 2017/0160798 A1 | 6/2017 | Lanman et al. | |
| 2017/0232343 A1* | 8/2017 | Yoshioka | A63F 13/525 |
| | | | 463/31 |
| 2017/0262045 A1* | 9/2017 | Rouvinez | G06F 3/011 |
| 2017/0315608 A1* | 11/2017 | Shanware | G06F 3/0346 |
| 2017/0322622 A1* | 11/2017 | Hong | G06F 3/017 |
| 2017/0336862 A1* | 11/2017 | Xu | G06F 3/0346 |
| 2017/0358140 A1* | 12/2017 | Kohler | G02B 27/0093 |
| 2017/0372748 A1* | 12/2017 | McCauley | G11B 27/031 |
| 2018/0024623 A1* | 1/2018 | Faaborg | G06F 3/0304 |
| | | | 345/156 |
| 2018/0046363 A1* | 2/2018 | Miller | G06F 3/017 |
| 2018/0081426 A1* | 3/2018 | Rothkopf | G02B 27/0179 |
| 2018/0210545 A1* | 7/2018 | Tuson | G06F 3/011 |
| 2018/0299947 A1* | 10/2018 | Chang | A63F 13/211 |
| 2018/0349705 A1* | 12/2018 | Kim | G06K 9/00744 |
| 2018/0374145 A1* | 12/2018 | Koon | G06Q 30/0643 |
| 2019/0064519 A1* | 2/2019 | Ben-Asher | G02B 27/017 |
| 2019/0141252 A1* | 5/2019 | Pallamsetty | H04N 5/23296 |
| 2019/0251672 A1* | 8/2019 | Lim | G06T 5/003 |

\* cited by examiner

SYSTEMS AND METHODS FOR CONTROLLING A FIELD OF VIEW

FIELD OF DISCLOSURE

The present disclosure relates generally to electronic devices. More specifically, the present disclosure relates to systems and methods for controlling a field of view.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, memory, and energy resources. The resources demanded may vary in accordance with the complexity of the processing.

Processing images may be challenging in some formats. For example, some users may not be pleased with image output in some formats. As can be observed from this discussion, systems and methods that improve image processing may be beneficial.

SUMMARY

A method performed by an electronic device is described. The method includes receiving surround view image content. The method also includes orienting a first field of view (FOV) of the surround view image content relative to a coordinate system of the surround view image content. The method further includes receiving a reorientation input. The method additionally includes determining a reorientation factor based on the reorientation input. The method also includes reorienting the first FOV to a second FOV of the surround view image content relative to the coordinate system based on the reorientation factor. The method further includes presenting the second FOV. The method may include remapping an audio field based on the reorientation factor.

Reorienting the first FOV may be based on a real-world orientation of the electronic device. Reorienting the first FOV may be based on the real-world orientation of the electronic device relative to the coordinate system of the surround view image content.

Determining the reorientation factor may include determining a target field of view based on the reorientation input and determining the reorientation factor based on the target field of view. Determining the reorientation factor may include determining a region of interest (ROI) based on the reorientation input, tracking the ROI, and determining the reorientation factor based on the tracked ROI.

Determining the reorientation factor may include determining an audio direction based on the reorientation input and determining the reorientation factor based on the audio direction. Determining the reorientation factor may include determining at least one hand gesture based on the reorientation input, determining a region of interest (ROI) based on the at least one hand gesture, and determining the reorientation factor based on the ROI.

An electronic device is also described. The electronic device includes a memory. The electronic device also includes a processor coupled to the memory. The processor is configured to receive surround view image content. The processor is also configured to orient a first field of view (FOV) of the surround view image content relative to a coordinate system of the surround view image content. The processor is further configured to receive a reorientation input. The processor is additionally configured to determine a reorientation factor based on the reorientation input. The processor is also configured to reorient the first FOV to a second FOV of the surround view image content relative to the coordinate system based on the reorientation factor. The processor is further configured to present the second FOV.

A non-transitory tangible computer-readable medium storing computer executable code is also described. The computer-readable medium includes code for causing an electronic device to receive surround view image content. The computer-readable medium also includes code for causing the electronic device to orient a first field of view (FOV) of the surround view image content relative to a coordinate system of the surround view image content. The computer-readable medium further includes code for causing the electronic device to receive a reorientation input. The computer-readable medium additionally includes code for causing the electronic device to determine a reorientation factor based on the reorientation input. The computer-readable medium also includes code for causing the electronic device to reorient the first FOV to a second FOV of the surround view image content relative to the coordinate system based on the reorientation factor. The computer-readable medium further includes code for causing the electronic device to present the second FOV.

An apparatus is also described. The apparatus includes means for receiving surround view image content. The apparatus also includes means for orienting a first field of view (FOV) of the surround view image content relative to a coordinate system of the surround view image content. The apparatus further includes means for receiving a reorientation input. The apparatus additionally includes means for determining a reorientation factor based on the reorientation input. The apparatus also includes means for reorienting the first FOV to a second FOV of the surround view image content relative to the coordinate system based on the reorientation factor. The apparatus further includes means for presenting the second FOV.

DETAILED DESCRIPTION

Figure 1:
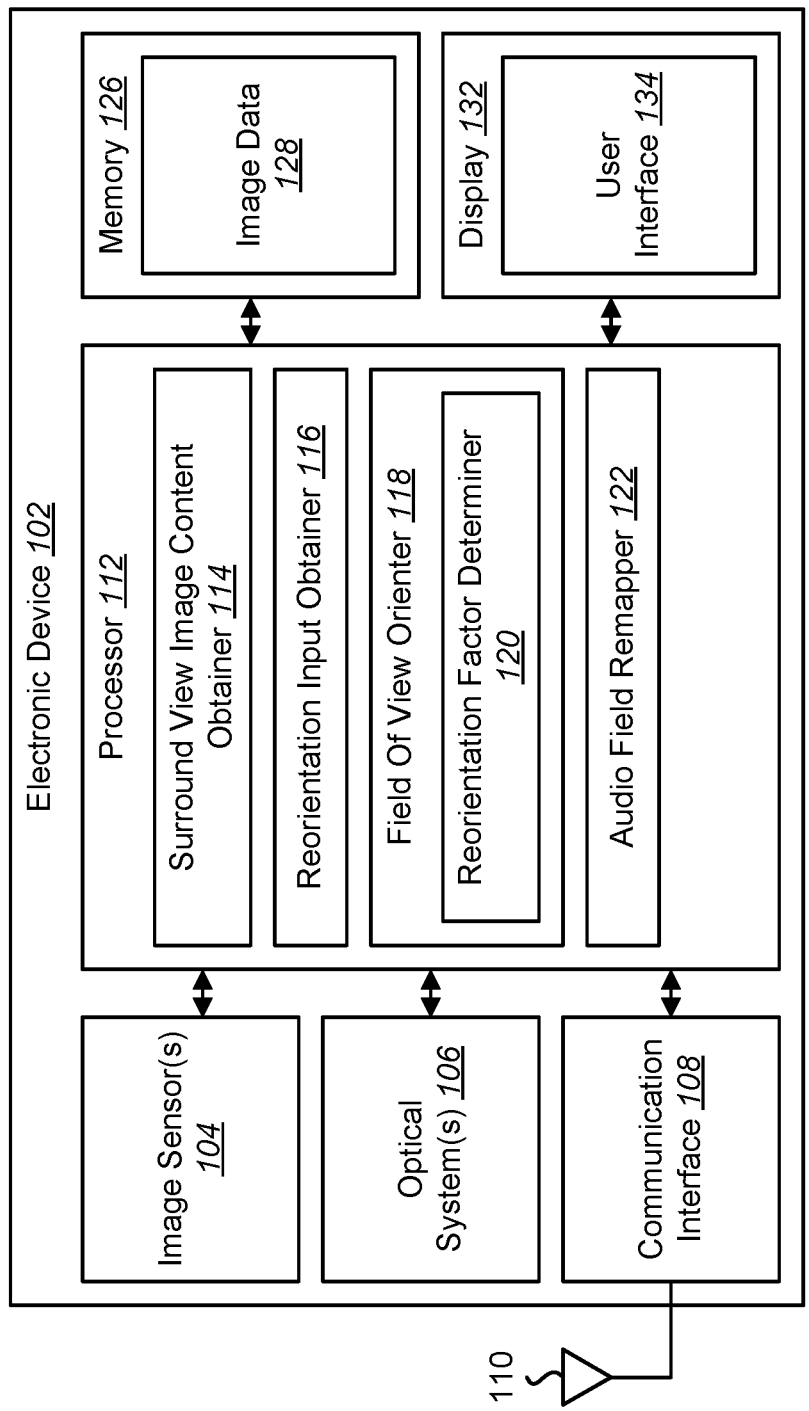
FIG. 1 is a block diagram illustrating one example of an electronic device in which systems and methods for controlling a field of view (FOV) may be implemented.

The systems and methods disclosed herein may relate to controlling a field of view. For example, it may be beneficial to move of field of view (FOV) in surround view image content (e.g., one or more surround view images, 360-degree camera content, 360-degree video, virtual reality environment images, etc.). Some configurations may enable moving the FOV based on a region of interest (ROI). For example, an FOV may be moved based on an ROI for 360-degree immersive video on virtual reality (VR) headsets.

In some approaches, 360-degree videos and/or three-dimensional (3D) 360-degree videos have fixed fields of view (FOVs) when watching videos in virtual reality mode. For example, if a person in the video moves away from the fixed FOV, the user has to move the VR headset to change the FOV every time. Having to move/change the position of the FOV of the video every time (by moving the VR headset, for example) to see an object of interest in 360-degree captured videos is not user-friendly. For instance, moving the VR enabled headset for more than five minutes cause discomfort and/or neck pain, etc.

In one example, a video conversation in 360-degree video mode may be presented, where the initial FOV is fixed to a front facing camera. When an object or person in the video conference moves away from initial fixed FOV, the user watching the video conference has to move the FOV in the VR headset by changing the position of the VR headset. If the target person moves to multiple positions, the user has to tilt/move his/her head to follow the person in video conference. This may cause neck pain, which is not user-friendly. This scenario may also impact audio (e.g., audio immersion). For example, center-channel audio may output vocal audio of a person that is speaking, even though the person does not appear in front of the user in the 360-degree video. The discrepancy between the audio and video may result in a non-immersive experience. Accordingly, some approaches to video player functionality may render a fixed FOV while watching video and do not have the ability (e.g., intelligence) to change the FOV based on user region of interest. Additionally, some approaches may not provide an interface or technique for a user to choose a region of interest while watching VR content. For instance, some touch interfaces and/or joystick interfaces may not work well in a VR context, since they may involve switching to/from VR and/or may not provide good accuracy. Accordingly, the user may not have a good option to choose a region of interest or to change the ROI when watching the VR content through a video conference.

Some configurations of the systems and methods disclosed herein may provide approaches to reduce and/or solve the problems described above. For example, some configurations may provide a video player with the ability (e.g., intelligence) to change the FOV based on tracking one or more people, objects, expressions, gestures, and/or director intended angle, etc. For instance, some configurations of the systems and methods disclosed herein may enable enhancement of the user experience in watching 360-degree videos (e.g., movies) without requiring a change in head position.

In order to address the above issue, some configurations may select a region of interest based on user input. For example, a device can lock onto a person in a video conference using computer vision (e.g., OpenCV) and/or machine learning algorithms to track face recognition. Whenever the person moves away in the initial fixed FOV, the face detection algorithm may send a signal to a VR headset to change the position of the FOV to follow the person in the video conference without user head movements. Thus, a user can experience immersive 360-degree video based on the region of interest without moving the user's head.

In some configurations, a region of interest (ROI) may be selected based on hand gestures from a user. In some approaches, the ROI may be selected during the presentation of 360-degree video in a VR headset. For example, a back camera of a mobile device (e.g., a mobile device that is inserted in a VR headset for rendering video in VR mode) may be active during presentation of the 360-degree video in the VR headset. While the user's head is moving while watching the 360-degree video, for instance, if the user wants to mark an ROI position, the user may show the user's hands to the back camera of the mobile device. The camera may capture the hand gesture(s), which may be provided to computer vision (e.g., OpenCV) and/or machine learning algorithms to detect the hand(s). A hand symbol may be composed on the 360-degree video (similar to augmented reality content, for example). Whenever the user draws a clockwise direction using high hands, the region of the gesture (e.g., ROI) may be selected. Accordingly, when there is motion in the ROI and/or of an object, a corresponding FOV may be displayed on VR content. This may provide a user with the flexibility of being able to choose an ROI using hand gestures.

Some configurations may additionally or alternatively change audio data rendering. For instance, the audio rendering may follow the person in the foregoing example (e.g., a person marked via user hand gestures). When the person moves from center to right, for example, the right channel audio may become the center channel so the user can clearly hear vocal audio from the person. In some configurations, computer vision and/or machine learning based algorithms may be utilized to process content (e.g., stitched video content) to detect an object and/or person, etc. A signal may be sent (to a VR device, for example) to change the FOV and to change the mapping of the audio channels for rendering.

With some configurations of the systems and methods disclosed herein, a user may be more immersed than in some approaches for 360-degree videos players. This may be achieved by providing video with a desired FOV. In some configurations, the FOV may be based on hand gestures (detected with a back camera on a mobile device, for example). Additionally or alternatively, a user may experience more immersive audio in some configurations, since the audio channels may be changed based on the FOV. Without the systems and methods disclosed herein, for example, a user may not have an immersive experience since the object(s) being watched by the user may be out of sync with the audio the user hears from the speakers.

Surround-view image content (e.g., one or more surround view images, 360-degree video, virtual reality environment images, immersive media, etc.) may increasingly gain importance (e.g., demand), as it may serve multiple applications (e.g., media, virtual reality, video conferencing, surveillance, gaming, movies, entertainment, etc.). Some examples of a capture setup may include multiple cameras covering a wide field of view (FOV) (e.g., a 360-degree FOV) in horizontal and/or vertical directions. One setup may include a dual wide-angle lens-based capture system. For example, an electronic device may include two fish-eye cameras, each with a FOV greater than 180 degrees. Other setups may include multiple wide-angle cameras (e.g., eight or sixteen action cameras combined in a ring or spherical arrangement). Data from each camera may be concurrently (e.g., synchronously) captured and/or stitched together to generate a 360-degree canvas. It should be noted that the systems and methods disclosed herein may be applicable for image and/or video use-cases.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for controlling a field of view (FOV) may be implemented. Examples of the electronic device 102 may include headsets (e.g., virtual reality (VR) headsets, augmented reality (AR) headsets, etc.), cellular phones, smart phones, computers (e.g., desktop computers, laptop computers, etc.), tablet devices, media players, cameras, video camcorders, digital cameras, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry), in a combination of hardware and software (e.g., a processor with instructions) and/or in a combination of hardware and firmware.

In some configurations, the electronic device 102 may include one or more processors 112, memory 126 (e.g., one or more memory devices), one or more displays 132, one or more image sensors 104, one or more optical systems 106, and/or one or more communication interfaces 108. The processor(s) 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system(s) 106. Additionally or alternatively, the electronic device 102 may or may not include a display 132. Additionally or alternatively, the electronic device 102 may or may not include a communication interface 108.

The memory 126 may store instructions and/or data. The processor 112 may access (e.g., read from and/or write to) the memory 126. Examples of instructions and/or data that may be stored by the memory 126 may include image data 128 (e.g., surround-view image content, surround-view video, wide-angle image data, normal image data, telephoto image data, etc.), object tracking data, region-of-interest (ROI) data, features, feature vectors, keypoint data, surround view image content obtainer 114 instructions, reorientation input obtainer 116 instructions, field of view orienter 118 instructions, reorientation factor determiner 120 instructions, and/or instructions for other elements, etc. In some configurations, the memory 126 may optionally include audio field remapper 122 instructions.

In some configurations, the electronic device 102 (e.g., the memory 126) may include an image data buffer (not shown). The image data buffer may buffer (e.g., store) image data (e.g., surround view image content frame(s)). The buffered image data may be provided to the processor 112.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. For example, the communication interface 108 may enable one or more kinds of wireless (e.g., cellular, wireless local area network (WLAN), personal area network (PAN), etc.) communication. Additionally or alternatively, the communication interface 108 may enable one or more kinds of cable and/or wireline (e.g., Universal Serial Bus (USB), Ethernet, High Definition Multimedia Interface (HDMI), fiber optic cable, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 (e.g., surround view image content obtainer 114) may obtain (e.g., receive) one or more images (e.g., surround-view image content, digital images, image frames, frames, video, wide-angle images, telephoto images, etc.). The one or more images (e.g., frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture (e.g., receive) the one or more images (e.g., image frames, video, still images, burst mode images, stereoscopic images, wide-angle images, telephoto images, etc.). In some configurations, the image sensor(s) 104 may capture the one or more images. In some implementations, the electronic device 102 may include multiple optical system(s) 106 and/or multiple image sensors 104. For example, the electronic device 102 may include multiple wide-angle lenses (e.g., fisheye lenses), multiple "normal" lenses, multiple telephoto lenses, and/or a combination of different kinds of lenses in some configurations. Different lenses may each be paired with separate image sensors 104 in some configurations. Additionally or alternatively, two or more lenses may share the same image sensor 104.

Additionally or alternatively, the electronic device 102 may request and/or receive the one or more images from another device (e.g., one or more external image sensors coupled to the electronic device 102, surround-view camera, 360-degree camera, VR camera, remote teleconference camera, drone camera, a network server, traffic camera, drop camera, automobile camera, web camera, smartphone camera, etc.). In some configurations, the electronic device 102 may request and/or receive the one or more images via the communication interface 108. For example, the electronic device 102 may or may not include a camera (e.g., an image sensor 104 and/or optical system 106) and may receive images (e.g., surround-view images, surround-view video, 360-degree images, wide-angle image(s), normal image(s), and/or telephoto image(s)) from one or more remote devices.

The electronic device may include one or more displays 132. The display(s) 132 may present one or more images (e.g., surround-view image content, surround view video, 360-degree video, still images, graphics, virtual environments, three-dimensional (3D) image content, symbols, characters, etc.). The display(s) 132 may be implemented with one or more display technologies (e.g., liquid crystal display (LCD), organic light-emitting diode (OLED), plasma, cathode ray tube (CRT), etc.). The display(s) 132 may be integrated into the electronic device 102 or may be coupled to the electronic device 102. In some configurations, the content described herein (e.g., surround-view image content, surround-view video, wide-angle images, telephoto images, stitched images, etc.) may be presented on the display(s) 132. For example, the display(s) 132 may present a field of view (FOV) of surround-view image content. In some configurations, all of portions of the images that are being captured by the image sensor(s) 104 may be presented on the display 132. Additionally or alternatively, one or more representative images (e.g., icons, cursors, virtual reality images, augmented reality images, etc.) may be presented on the display 132.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera and may detect user gestures (e.g., hand gestures, arm gestures, eye tracking, eyelid blink, etc.). In another example, the electronic device 102 may be linked to a mouse and may detect a mouse click. In yet another example, the electronic device 102 may be linked to one or more other controllers (e.g., game controllers, joy sticks, touch pads, motion sensors, etc.) and may detect input from the one or more controllers.

In some configurations, the electronic device 102 and/or one or more components or elements of the electronic device 102 may be implemented in a headset. For example, the electronic device 102 may be a smartphone mounted in a headset frame. In another example, the electronic device 102 may be a headset with integrated display(s) 132. In yet another example, the display(s) 132 may be mounted in a headset that is coupled to the electronic device 102.

In some configurations, the electronic device 102 may be linked to (e.g., communicate with) a remote headset. For example, the electronic device 102 may send information to and/or receive information from a remote headset. For instance, the electronic device 102 may send image information (e.g., surround view image content, one or more images, video, one or more frames, etc.) to the headset and/or may receive image information (e.g., captured images, captured video, etc.) from the headset. Additionally or alternatively, the electronic device 102 may send other information (e.g., a reorientation factor) to the headset and/or may receive other information (e.g., orientation data, orientation sensor data, motion sensor data, etc.) from the headset.

In some configurations, the electronic device 102 may include one or more orientation and/or motion sensors (not shown). For example, the electronic device 102 may include one or more accelerometers, tilt sensors, gyros, etc. The orientation and/or motion sensor(s) may be utilized to detect real-world orientation and/or movement (e.g., rotations in one or more dimensions and/or translations in one or more dimensions) of the electronic device 102. In some approaches, the motion sensor(s) may be utilized to orient a field of view (FOV) of surround view image content.

The processor 112 may include and/or implement a surround view image content obtainer 114, a reorientation input obtainer 116, and/or a field of view orienter 118. The processor 112 may optionally include and/or implement an audio field remapper 122. In some configurations, the field of view orienter 118 may include a reorientation factor determiner 120. It should be noted that one or more of the elements illustrated in the electronic device 102 and/or processor 112 may be optional. For example, the processor 112 may not include and/or implement the audio field remapper 122 in some configurations. Additionally or alternatively, one or more of the elements illustrated in the processor 112 may be implemented separately from the processor 112 (e.g., in other circuitry, on another processor, on a separate electronic device, etc.).

The processor 112 may include and/or implement a surround view image content obtainer 114. Surround-view image content may be image content (e.g., one or more images, video, etc.) that partially or completely surrounds an observation point. For example, surround-view image content may be viewable in a full rotation around the observation point in one or more directions. For instance, surround-view image content may be viewable in 360 degrees of yaw and ±180 degrees of pitch. In some approaches, surround-view image content may be visualized as image content mapped to the interior of a sphere or ellipsoid centered on the observation point.

One or more images (e.g., surround view image content, 360-degree video, image frames, video, burst shots, etc.) may be provided to the surround view image content obtainer 114. For example, the surround view image content obtainer 114 may obtain (e.g., receive) image frames from one or more image sensors 104. For instance, the surround view image content obtainer 114 may receive image data from one or more image sensors 104 and/or from one or more remote cameras. As described above, the image(s) may be captured from the image sensor(s) 104 included in the electronic device 102 and/or may be captured from one or more remote camera(s). In some configurations, the surround view image content obtainer 114 may obtain multiple images (e.g., multiple surround view images, multiple wide-angle images, multiple normal images, multiple telephoto images, and/or a combination of different kinds of images).

In some approaches, the electronic device 102 (e.g., processor 112) may combine multiple images (e.g., dual wide-angle images from the image sensor(s) 104) to produce the surround view image content.

In some cases, one or more of the images (e.g., surround view image content, other images, etc.) may include one or more moving objects. A moving object may be moving in the image(s) due to movement of the object itself (relative to a scene or background, for example) and/or due to movement of the image sensor(s) that capture surround view image content. For instance, a moving object may be changing position through a series of images (e.g., image frames, video, etc.). It should be noted that the electronic device 102 may obtain (e.g., capture, receive, etc.) one or more images that are not part of the surround view image content in some configurations. For example, the electronic device 102 may capture images of a user's hands for gesture recognition, which may be separate from surround view image content. In some configurations, the surround view image content may include content for gesture recognition.

In some configurations, the surround view image content obtainer 114 may request and/or receive one or more images (e.g., surround view image content, 360-degree video, image frames, etc.). For example, the surround view image content obtainer 114 may request and/or receive one or more images from a remote device (e.g., external camera(s), remote server, remote electronic device, etc.) via the communication interface 108. For instance, the surround view image content obtainer 114 may receive surround view image content (e.g., 360-degree video) from a remote teleconferencing camera.

In some configurations, the surround view image content obtainer 114 may obtain rendered (e.g., computer-generated) surround view image content. For example, the electronic device 102 may generate (e.g., render) a virtual environment as surround view image content. Additionally or alternatively, the surround view image content obtainer 114 may request and/or receive rendered surround view image content from another device (e.g., a remote device, a server, a game system, etc.).

The processor 112 may include and/or implement a field of view orienter 118. The field of view orienter 118 may orient an FOV of the surround view image content. For example, the field of view orienter 118 may determine an FOV of the surround view image content for presentation. The FOV may indicate a portion of the surround view image content for display. An FOV may be specified with one or more parameters (e.g., center point, direction, size, shape, and/or corner vectors, etc.). In some implementations, an FOV may be rectangular and a set of vectors (e.g., 4 vectors) may represent the corners of the FOV. In some approaches, a point (e.g., center point) may determine a direction (e.g., orientation) of the FOV. In some examples, a set of vectors may describe non-rectangular shaped FOVs.

It should be noted that the surround view image content may have an associated coordinate system. In some approaches, the surround view image content coordinate system may be set (e.g., predetermined) in accordance with the image content. For example, a principle axis of a front-facing lens of a dual-lens 360-degree camera may correspond to the forward axis of the surround view image content coordinate system.

In some approaches, the FOV may be determined (e.g., oriented) based on a real-world orientation of a device (e.g., the electronic device 102 or another device) relative to a coordinate system of the surround view image content. For example, the FOV may be an area of the surround view image content relative to a real-world orientation (e.g., pointing direction and/or roll, pitch, and yaw, etc.) of a device (e.g., headset). For instance, when a headset is oriented (in the real world, for example) with zero roll, pitch, and yaw, the FOV may be centered on a forward axis of the coordinate system of the surround view image content (e.g., the headset pointing direction may be aligned with the forward axis). As the orientation of the device changes (as indicated by orientation and/or motion sensors, for example), the FOV orientation may be changed in accordance with the orientation of the device. For example, if a user wearing a headset rotates the headset 90 degrees to the left, the field of view orienter 118 may rotate the FOV of the surround view image content 90 degrees to the left.

In accordance with some configurations of the systems and methods disclosed herein, the electronic device 102 may reorient the FOV of the surround view image content. Reorienting the FOV may be based on a reorientation input that is separate from (e.g., different from, in addition to, or alternatively from) orientation input (e.g., real-world device orientation). The reorientation input obtainer 116 may obtain the reorientation input. The reorientation input may indicate a target FOV of the surround view image content and/or a region of interest of the surround view image content. Examples of the reorientation input may include controller input, mouse input, touch input, gesture input, sound input, speech input, etc.

The processor 112 (e.g., reorientation input obtainer 116 and/or reorientation factor determiner 120) may determine the target FOV and/or ROI based on the reorientation input. In some approaches, the processor 112 may determine the target FOV as a portion of the surround view image content corresponding to the reorientation input. For example, if the electronic device 102 detects a click or button press corresponding to a point of the surround view image content, the target FOV may enclose (e.g., may be centered on) the point.

In some approaches, the processor 112 (e.g., reorientation input obtainer 116 and/or reorientation factor determiner 120) may determine a region of interest (ROI) based on the reorientation input. For example, the reorientation input may indicate a portion of the surround view image content with a shape (e.g., a partially containing shape, an enclosed shape, a circular shape, a box-like shape, etc.). For instance, the electronic device 102 may detect a click and drag input indicating a circular shape or a box-like shape around a portion of the surround view image content. In another example, the electronic device 102 may detect a hand gesture input or controller input that partially contains a portion of the surround view image content with a partially containing shape (e.g., a "u" shape, a "c" shape, an "n" shape, etc.). In yet another example, the electronic device 102 may detect an input (e.g., button press on a bounding box of a person's face, a speech input indicating an object or person, etc.) that selects a particular object or person in the surround view image content. In yet another example, the electronic device 102 may detect an audio (e.g., sound and/or speech) input as the reorientation input. For example, the electronic device 102 may include one or more microphones for detecting audio.

The processor 112 may utilize the reorientation input to determine the ROI. In some approaches, the ROI may be located (e.g., centered) at the center of the portion of the surround view image content indicated by the reorientation input. The size of the ROI may be predetermined or may be determined based on the size of the portion indicated by the reorientation input. Additionally or alternatively, the ROI shape and/or size may be based on one or more objects partially contained in or enclosed by the portion indicated by the reorientation input. For example, the processor 112 (e.g., reorientation input obtainer 116 and/or reorientation factor determiner 120) may detect one or more objects (e.g., faces, people, or other objects) and may tightly bound the object(s) in the ROI. In some configurations, the electronic device 102 (e.g., processor 112) may perform object detection to detect an object and/or to determine an ROI of the object. In some approaches, object detection may be performed by searching the image (e.g., one or more areas of the image at one or more scales) for the object (e.g., keypoints of an object, feature vectors of an object, etc.). The ROI may be determined as an area (e.g., rectangular area) that includes and bounds the object.

In some configurations, the processor 112 (e.g., reorientation input obtainer 116 and/or reorientation factor determiner 120) may track the ROI (e.g., object(s) within the ROI) over two or more frames. For example, the processor 112 may utilize one or more object detection and/or object tracking algorithms (e.g., optical flow) to track the movement of the ROI from frame-to-frame. In some approaches, the processor 112 (e.g., reorientation input obtainer 116 and/or reorientation factor determiner 120) may determine one or more features (e.g., feature vectors, keypoints, corners, etc.) of the surround view image content within the ROI for tracking. For example, the processor 112 may determine the features in the ROI of a first frame of the surround view image content and then may search a second (e.g., subsequent) frame for the features in order to track the ROI in the second frame. The search may be based on image and/or feature correlation between frames in some approaches.

In some configurations, the electronic device 102 (e.g., processor 112, reorientation input obtainer 116, and/or reorientation factor determiner 120) may determine an audio direction based on the reorientation input. For example, audio signals from multiple microphones may be utilized to determine a direction of audio (e.g., a particular sound, any speech, speech from a particular person, etc.). For instance, audio phase and/or sound pressure between audio signals of multiple microphones may indicate the audio direction. In some approaches, the electronic device 102 (e.g., processor 112) may perform audio source recognition (e.g., matching an audio signal to a known audio source, such as a person) and may determine the audio direction corresponding to the recognized audio source. For example, the reorientation input may indicate selection of a particular audio source (e.g., person). The audio direction for that audio source may be recognized and/or tracked.

The reorientation factor determiner 120 may determine a reorientation factor based on the target FOV, based on the ROI (e.g., tracked ROI), and/or based on the audio direction. The reorientation factor may indicate one or more values (e.g., a vector) for a reorientation of the FOV of the surround view image content and/or for reorientation of an FOV anchor of the surround view image content. For example, the reorientation factor may indicate one or more rotations and/or translations in one or more dimensions (e.g., yaw, pitch, roll, and/or x, y, z axes, etc.) such that the FOV (or FOV anchor) corresponds to the target FOV, ROI, and/or audio direction. In some approaches, determining the reorientation factor may include determining a difference vector between an axis of the surround view image content coordinate system and a direction of the target FOV, the ROI, and/or the audio direction. The difference vector may be an example of the reorientation factor, which may indicate an amount and direction (e.g., rotation) by which the FOV (and/or FOV anchor) may be reoriented. In some configurations, for example, based on the movement of an object, the reorientation factor determiner 120 may determine the direction of the reorientation (e.g., if the object moves from center to left, the direction of the object may be determined). Additional examples of determining the reorientation factor are given in connection with one or more of FIG. 12 or 13.

It should be noted that an FOV anchor may be a nominal position (e.g., forward axis) relative to which the FOV may be oriented. For example, a default FOV anchor may correspond to the forward axis of the surround view image content (e.g., the headset rotation relative to the FOV anchor may determine the FOV orientation).

The field of view orienter 118 may reorient the FOV of the surround view image content based on a real-world orientation of a device (e.g., of the electronic device 102 or of another device) relative to a coordinate system of the surround view image content and based on the reorientation factor. For example, the reorientation factor may be applied (by the field of view orienter 118, for instance) to reorient the FOV (and/or FOV anchor) of the surround view image content to a different location of the surround view image content. In some approaches, based on the direction of the object, the FOV will change with a certain angle. For instance, the field of view orienter 118 may rotate and/or translate the FOV (and/or the FOV anchor) relative to the coordinate system of the surround view image content. In one example, the field of view orienter 118 may reorient the FOV such that the FOV corresponds to (e.g., aligns with) the target FOV indicated by the reorientation input. In another example, the field of view orienter 118 may reorient the FOV such that the FOV corresponds to (e.g., aligns with, moves with, etc.) the ROI.

In one example, a user may orient a VR headset to be viewing directly upward (e.g., may lay down with the VR headset oriented directly upward along the y axis). As described herein, the field of view orienter 118 may reorient the FOV based on the real-word pose (e.g., position and/or orientation) of the electronic device 102 (e.g., VR headset). For example, even though the VR headset is oriented directly upward, the FOV may be reoriented to be facing directly forward (e.g., along a z axis) in the surround view image content. In some approaches, the electronic device 102 (e.g., reorientation factor determiner 120) may determine a reorientation factor relative to the electronic device 102 (e.g., VR headset) orientation to reorient the FOV to a target FOV and/or ROI, etc.

In some configurations, reorienting the FOV may include adding an orientation (e.g., the real-world orientation of the device) to the reorientation factor. For example, the yaw, pitch, and roll of the reorientation factor may be added to the yaw, pitch, and roll of a headset relative to the coordinate system of the surround view image content. More specific examples of approaches for reorienting the FOV are given in connection with one or more of FIG. 12 or 13.

In some approaches, the FOV anchor may be reoriented, which may allow for anchoring a nominal device position (e.g., zero yaw, pitch, and roll of a headset) to the target FOV and/or to the ROI. For example, the nominal headset position may be centered on the target FOV, the ROI, and/or the audio direction, where the FOV is allowed to depart from the target FOV, ROI and/or audio direction based on an orientation input. For instance, assume that an ROI tracks a moving person in the surround view image content and that the reorientation factor is applied to reorient the FOV anchor such that the FOV anchor tracks the moving person. The FOV orientation may depart from the moving person when a headset detects a rotation from a nominal position (e.g., zero yaw, pitch, and roll). Accordingly, a user may rotate the headset to view surround view image content to the left or right of the moving person. In other configurations, the reoriented FOV may be locked to the target FOV, the ROI, and/or the audio direction regardless of headset position.

In some configurations, the audio field remapper 122 may remap an audio field based on the reorientation factor. For example, the surround view image content may be associated with a directional audio field in some implementations. For instance, the electronic device 102 may include and/or may be coupled to multiple microphones that may capture the audio field. Additionally or alternatively, the electronic device 102 may receive the audio field from another device (e.g., a surround view video camera, a 360-degree teleconferencing camera, a game console, etc.). Additionally or alternatively, the electronic device 102 may generate the audio field. For example, the electronic device 102 may generate a directional audio field corresponding to rendered surround view image content. The directionality of the audio field may correspond to the coordinate system of the surround view image content.

Reorienting the FOV of the surround view image content without remapping the audio field may cause a discrepancy between the image content and the audio content. For example, assume that an FOV is reoriented 90 degrees to the left to track a person. If the audio field directionality remains the same, a user may hear the person from the left while seeing the person directly in front. Some configurations of the systems and methods disclosed herein may remap the audio field such that the directionality of the audio field substantially matches the reoriented FOV.

In some configurations, remapping the audio field may include adjusting audio field directionality based on the reorientation factor. For example, the audio field remapper 122 may remap input (e.g., microphone) channels to different output (e.g., speaker, headphone, etc.) channels based on the reorientation factor. Additionally or alternatively, the audio field remapper 122 may adjust audio signal delays (e.g., audio signal phases) in the output (e.g., speaker, headphone, etc.) channels based on the reorientation factor. Remapping the audio field may adjust the audio field such that the audio field directionality corresponds to (e.g., is consistent with) the (reoriented) FOV.

In some configurations, the electronic device 102 may present the reoriented FOV. For example, the electronic device 102 may present the reoriented FOV on the one or more displays 132. Additionally or alternatively, the electronic device 102 may send (e.g., transmit) the reoriented FOV to another device. In some approaches, the electronic device 102 may send the reorientation factor to another device. For example, the electronic device 102 may send the reorientation factor to a VR headset to enable the VR headset to reorient the FOV.

It should be noted that one or more of the functions and/or operations described herein may be performed for a series of images (e.g., image frames, video, etc.). For example, the electronic device 102 may obtain a series of images, receive reorientation input, determine a reorientation factor for one or more of the series of images, reorient the FOV for one or more of the series of images, and/or may present the reoriented FOV for one or more of the series of images.

It should be noted that the systems and methods disclosed herein may be implemented in one or more devices. In some implementations, for example, the electronic device 102 may be a camera that captures surround view image content and performs FOV reorientation and/or audio field remapping. In some implementations, the electronic device 102 may receive the surround view image content from a remote device, may perform FOV reorientation and/or audio field remapping, and/or may send the reoriented FOV and/or remapped audio field to another device (e.g., a headset) for display and/or output. In some implementations, the electronic device 102 may be a headset that performs FOV reorientation and/or audio field remapping and presents the reoriented FOV and/or outputs the remapped audio field. In some implementations, the electronic device 102 may determine a reorientation factor and may send the reorientation factor to another device (e.g., a headset) for application to produce a reoriented FOV and/or remapped audio field. In some implementations, the electronic device 102 may receive one or more inputs (e.g., orientation input, reorientation input, etc.) from another device. Other implementations are possible.

It should be noted that the systems and methods disclosed herein (e.g., the electronic device 102) may be implemented in a variety of contexts and/or devices. For example, the electronic device 102 may be implemented as part of a smart home, a mobile platform, a VR headset, an augmented reality (AR) headset, a home theater, a cinema device, user interface, etc. The systems and methods disclosed herein may be applied in various contexts, such as in health and fitness applications, entertainment applications, military applications, business applications, etc. For example, the systems and methods disclosed herein may be utilized to present 360-videos from online platforms, cinema, and/or home theater for immersive video and/or audio presentation.

It should be noted that one or more of the elements or components of the electronic device 102 may be combined and/or divided. For example, one or more of the surround view image content obtainer 114, the reorientation input obtainer 116, the field of view orienter 118, the reorientation factor determiner 120, and/or the audio field remapper 122 may be combined. Additionally or alternatively, one or more of the surround view image content obtainer 114, the reorientation input obtainer 116, the field of view orienter 118, the reorientation factor determiner 120, and/or the audio field remapper 122 may be combined may be divided into elements or components that perform a subset of the operations thereof.

Figure 2:
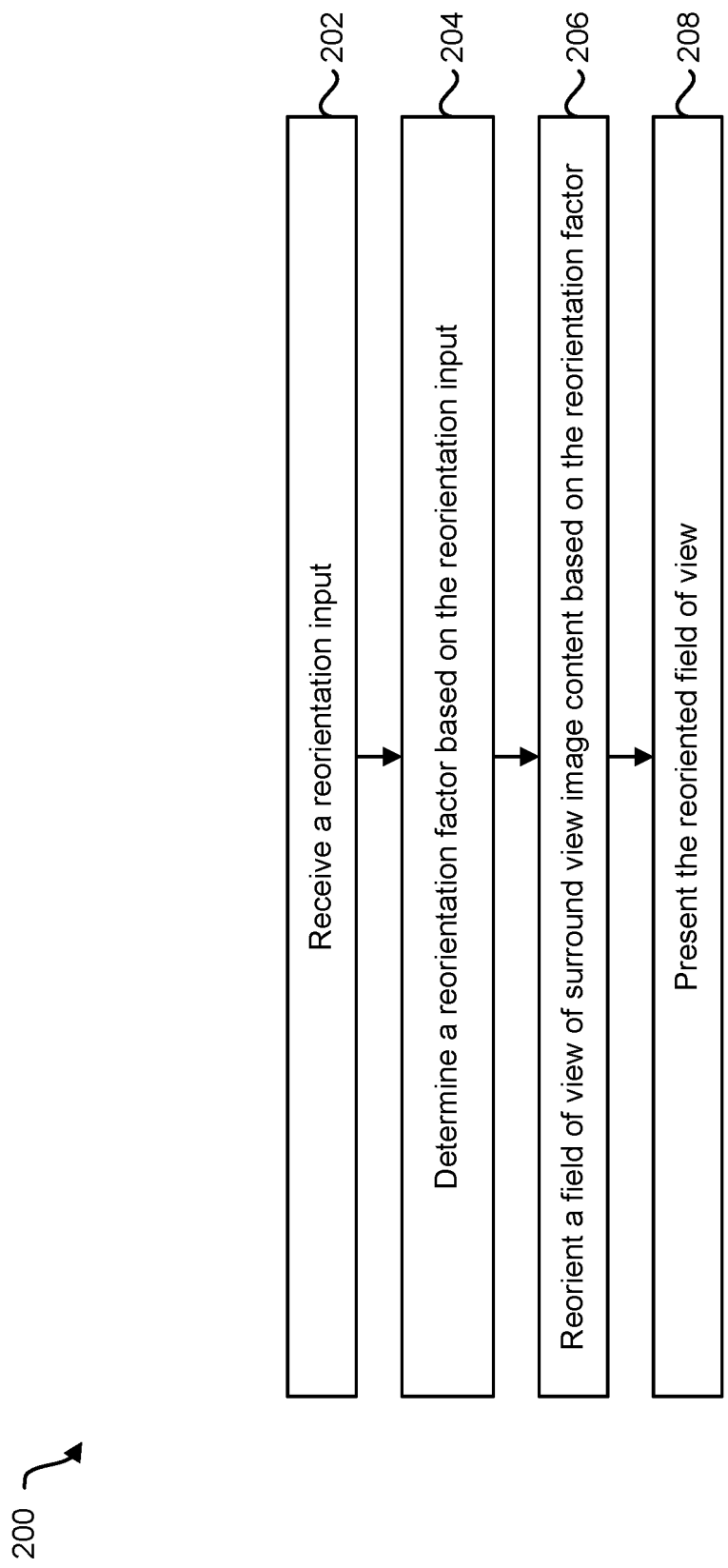
FIG. 2 is a flow diagram illustrating one configuration of a method for controlling an FOV.

FIG. 2 is a flow diagram illustrating one configuration of a method 200 for controlling a field of view (FOV). The method 200 may be performed by the electronic device 102 described in connection with FIG. 1, for example. In some configurations, the electronic device 102 may obtain (e.g., receive) surround view image content as described in connection with FIG. 1. In some approaches, the FOV of the surround view image content may be oriented relative to the coordinate system of the surround view image content. This may be accomplished as described in connection with FIG. 1. For example, the electronic device 102 may detect real-world orientation and/or movement to orient the FOV relative to the coordinate system of the surround view image content.

The electronic device 102 may receive 202 a reorientation input. This may be accomplished as described in connection with FIG. 1. For example, the electronic device 102 may receive a reorientation input using an input device (e.g., camera(s), controller(s), mouse, microphone(s), touch screen, touch pad, etc.).

The electronic device 102 may determine 204 a reorientation factor based on the reorientation input. This may be accomplished as described in connection with FIG. 1. For example, the electronic device 102 may determine a target FOV based on the reorientation input and may determine the reorientation factor based on the target FOV. In another example, the electronic device 102 may determine an ROI based on the reorientation input, track the ROI, and determine the reorientation factor based on the tracked ROI. In yet another example, the electronic device 102 may determine an audio direction based on the reorientation input and may determine the reorientation factor based on the audio direction. In yet another example, the electronic device 102 may determine one or more hand gestures based on the reorientation input, may determine an ROI based on the hand gesture(s), and may determine the reorientation factor based on the ROI.

The electronic device 102 may reorient 206 an FOV of surround view image content based on the reorientation factor. This may be accomplished as described in connection with FIG. 1. For example, the electronic device 102 may rotate and/or translate the FOV (or FOV anchor) based on the reorientation factor. Accordingly, the FOV may be reoriented based on a target FOV, ROI (selected with hand gestures, for example), and/or audio direction in some configurations. Reorienting the FOV may produce a reoriented FOV.

The electronic device 102 may present 208 the reoriented FOV. This may be accomplished as described in connection with FIG. 1. For example, the electronic device 102 may present the reoriented FOV on a display and/or send the reoriented FOV to another device. In some configurations, the electronic device 102 may send the reorientation factor to another device to enable the other device to reorient and/or present the reoriented FOV.

It should be noted that one or more steps of the method 200 may be rearranged and/or omitted in some configurations. For example, reorienting 206 the FOV and/or presenting 208 the reoriented FOV may be omitted in some configurations.

Figure 3:
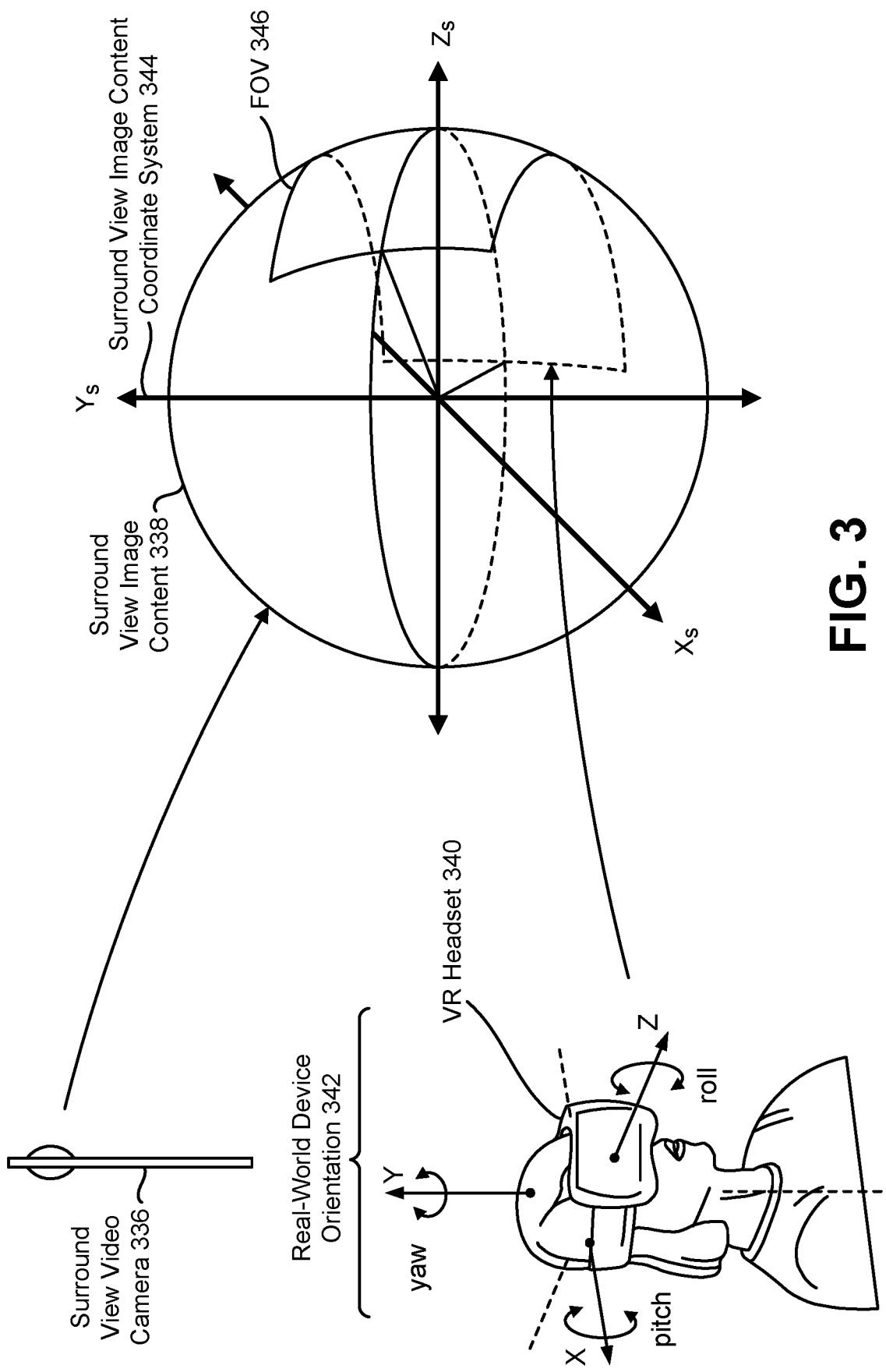
FIG. 3 is a diagram illustrating an example of FOV orientation.

FIG. 3 is a diagram illustrating an example of FOV orientation. In particular, FIG. 3 illustrates an example of surround view image content 338. In some examples, a surround view video camera 336 may be utilized to produce the surround view image content 338. For instance, the surround view video camera 336 may include dual wide-angle lenses that may be utilized to capture two wide angle images that may be combined (e.g., stitched) to produce surround view video. In FIG. 3, the surround view image content 338 is illustrated as being mapped to the interior of a sphere with a surround view image content coordinate system 344 (which may be expressed in terms of $X_s$, $Y_s$, and $Z_s$ axes, for example) and an observation point at the origin.

As can be observed in FIG. 3, the FOV 346 may include a portion of the surround view image content 338. The FOV orientation may be determined based on a real-world device orientation 342 of a VR headset 340. In particular, the yaw, pitch, and roll of the VR headset may determine the orientation (e.g., pointing direction) of the FOV 346.

As discussed above, some problems may arise when viewing surround view (e.g., 360-degree) video. For example, the initial FOV 346 may be set to the front facing camera (e.g., the principal axis) of the surround view video camera 336. In this example, assume that the user is having a video conversation in 360 video mode. When an object or person in the video conference moves away from the initial set FOV 346, the user watching the video conference has to move the FOV 346 by changing the position (e.g., rotation) of the VR headset 340. If the object or person moves, the user has to tilt and/or move her head to follow the object or person in video conference. In some cases, this may cause discomfort and/or neck pain, particularly if the user has to maintain a non-neutral neck rotation for an extended period.

Figure 4:
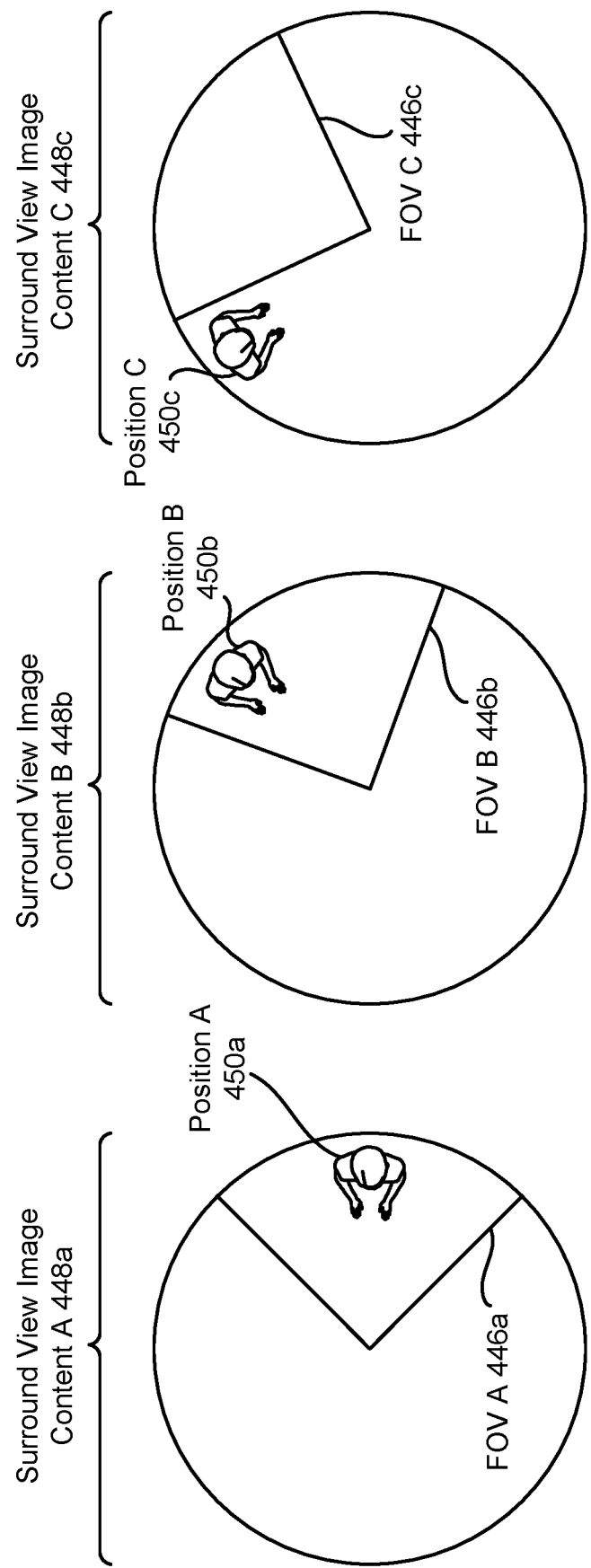
FIG. 4 is a diagram illustrating examples of surround view image content.

FIG. 4 is a diagram illustrating examples of surround view image content 448a-c. In FIG. 4, the examples of surround view image content 448a-c are given from a top-down perspective for simplicity, where the right side of the diagram corresponds to the "front" of surround view content A-C 448a-c. It should be noted that the surround view image content 448a-c may be three-dimensional (e.g., spherical, ellipsoidal, etc.).

In surround view image content A 448a, a person is standing at position A 450a (e.g., at the front of surround view image content A 448a). As illustrated in FIG. 4, FOV A 446a includes the person. In surround view image content B 448b, the person has moved to position B 450b. In order to keep the person in FOV B 446b, a user may rotate the headset to the left to follow the person. For example, the user may have to change the FOV by moving (e.g., rotating and/or tilting) the user's head, where the motion sensor in the VR headset changes the FOV based on the head direction. In surround view image content C 448c, the person has moved to position C 450c. Even though the user has rotated the headset even further to the left, the user's neck may be unable to rotate further, and the person may exit FOV C 446c. For example, the user has to change the FOV by moving (e.g., rotating and/or tilting) the user's head, but the user's head may be unable to rotate any further. Additionally or alternatively, moving the headset frequently and/or having to maintain the headset in a non-neutral position for an extended period of time may lead to fatigue, discomfort, and/or pain. The scenario described in connection with FIG. 4 illustrates some of the issues with some approaches to move an FOV with a headset.

Figure 5:
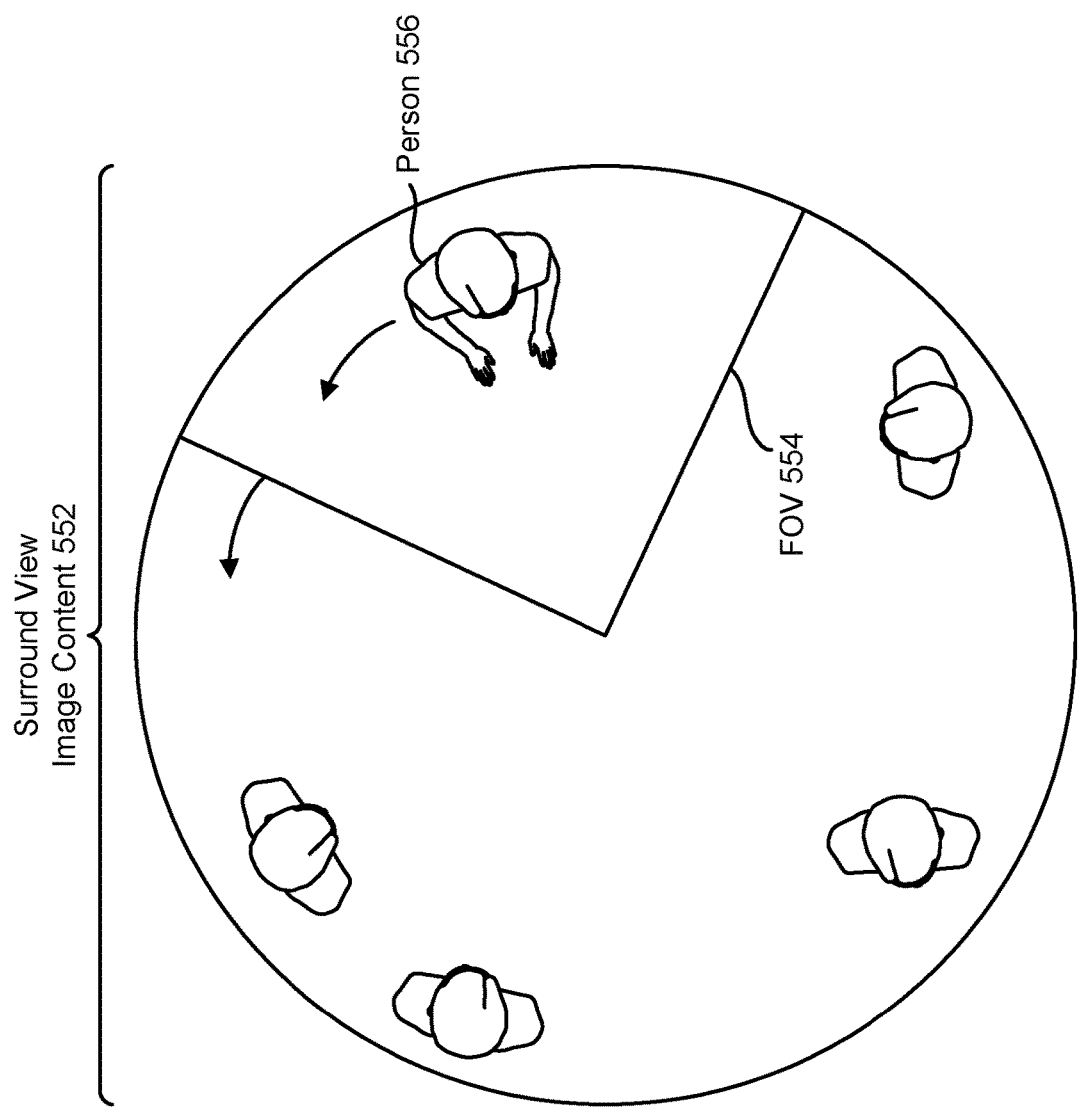
FIG. 5 is a diagram illustrating an example of controlling an FOV in accordance with some configurations of the systems and methods disclosed herein.

FIG. 5 is a diagram illustrating an example of controlling an FOV 554 in accordance with some configurations of the systems and methods disclosed herein. In particular, FIG. 5 illustrates an example of an FOV 554 with respect to surround view image content 552 from a top-down perspective, where the right side of the diagram corresponds to the "front" of the surround view image content 552. In order to address the above issue(s), an electronic device (e.g., the electronic device 102) may select an ROI corresponding to a person 556 based on a reorientation input. For example, the electronic device may lock onto a person 556 who is in a conference call using computer vision (e.g., OpenCV) and/or machine learning algorithms to track facial recognition.

Whenever the person 556 moves away in the initial FOV 554, the face detection (e.g., tracking) algorithm may send a signal to the VR headset sensor to change the position of the FOV 554 to follow the person 556 in the video conference without changing the headset orientation (e.g., user head rotation and/or movement). For example, a motion capture algorithm may detect the motion of the person 556 and send data (e.g., a reorientation factor) to the VR headset indicating a reorientation of the FOV 554 (e.g., a direction to move the FOV 554). Accordingly, the headset may provide 3D 360-degree immersive video without changing the orientation of the head based on an ROI.

Figure 6:
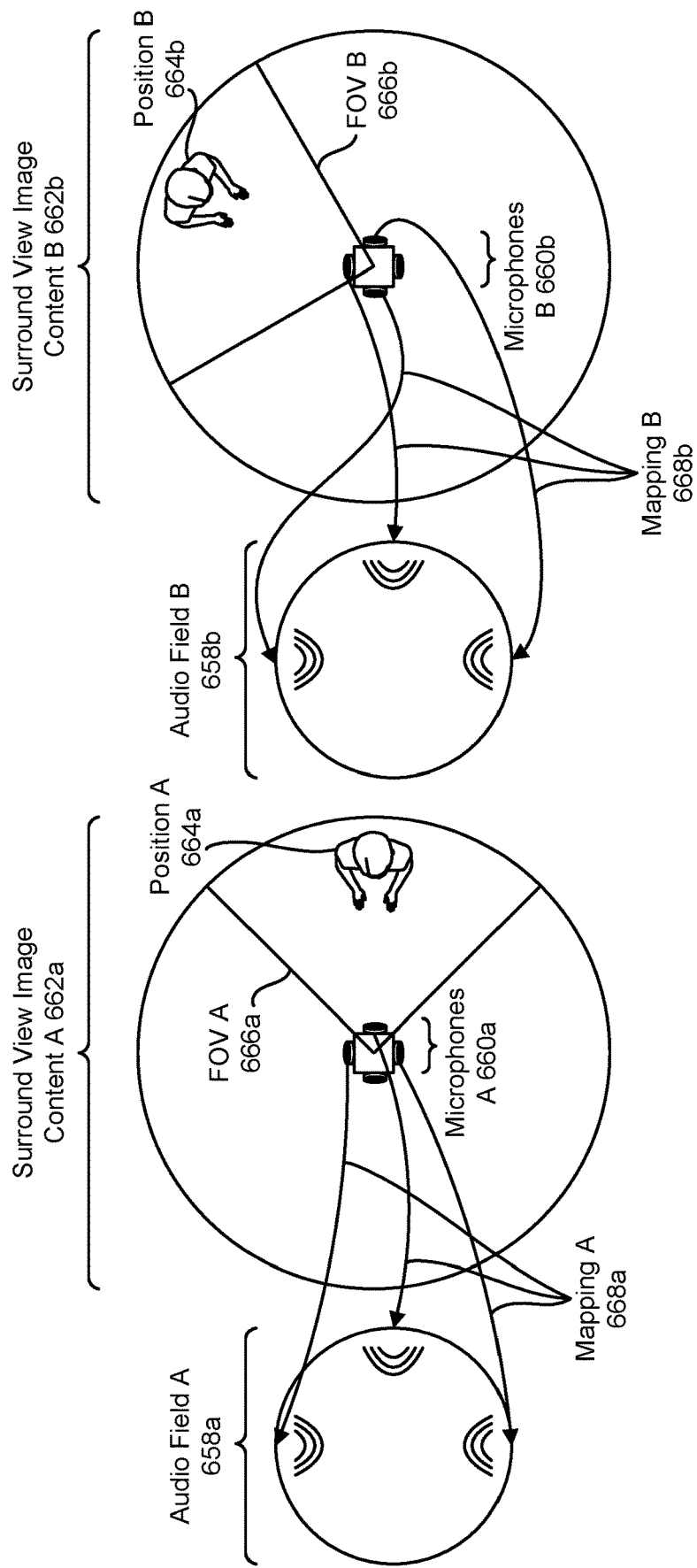
FIG. 6 is a diagram illustrating an example of audio field remapping.

FIG. 6 is a diagram illustrating an example of audio field remapping. In particular, FIG. 6 illustrates surround view image content A 662a, where a person is at position A 664a in FOV A 666a. It should be noted that surround view image content A-B 662a-b are illustrated from a top-down perspective, where the right side of the diagram corresponds to the "front" of surround view image content A-B 662a-b. Microphones A 660a on a device (e.g., 360-degree video camera, etc.) are also illustrated in relation to surround view image content A 662a. For example, 4 microphones may be configured to capture audio in four directions. For instance, a frontal microphone (e.g., "mic 1") faces the person at position A 664a, a right microphone (e.g., "mic 2") is provided, a left microphone (e.g., "mic 3") is provided, and a rear microphone (e.g., "mic 4") is provided. Audio field A 658a is an audio field corresponding to surround view image content A 662a. Mapping A 668a is a mapping between the captured audio from microphones A 660a to audio field A 658a. An audio field (e.g., audio field A 658a, audio field B 658b) may be produced by a set of speakers (e.g., headphones, earbuds, loudspeakers, surround sound speaker system, etc.). As illustrated in FIG. 6, mapping A 668a maps the audio signals captured by microphones A 660a to audio field A 658a such that sound (e.g., speech) produced by the person at position A 664a is mapped to the frontal position of audio field A 658a, sound from the left is mapped to a left position of audio field A 658a, and sound from the right is mapped to a right position of audio field A 658a. For instance, the front microphone audio may be mapped to the center audio channel of audio field A 658a, the left microphone audio may be mapped to the left audio channel of audio field A 658a, and the right microphone audio may be mapped to the right audio channel of audio field A 658a. In some configurations, sound from the rear may be mapped to a rear position of audio field A 658a. For example, the rear microphone audio may be mapped to a rear audio channel of audio field A 658a.

In the example of FIG. 6, assume that a motion capture algorithm (e.g., ROI tracking) senses the motion of the person and sends data (e.g., a reorientation factor) to a VR headset indicating which direction to change the FOV. Accordingly, FOV A 666a may move to FOV B 666b when the person at position A 664a moves to position B 664b. In accordance with some configurations of the systems and methods disclosed herein, the audio field may be remapped. For example, audio from microphones B 660b may be remapped in accordance with mapping B 668b to produce audio field B 658b such that audio from the person at position B 664b may be perceived as being from the front. For example, left microphone (mic 3) audio may be mapped to the center audio channel in audio field B 658b. Other microphone audio may also be remapped (e.g., frontal microphone (mic 1) audio may be mapped to right audio channel and rear microphone (mic 4) audio may be mapped to the left audio channel). In some configurations, right microphone (mic 2) audio may be mapped to the rear audio channel. Remapping the audio field may be performed based on the reorientation factor. For example, the reorientation factor may indicate a degree and/or direction of rotation for remapping microphone audio to the audio field.

Figure 7:
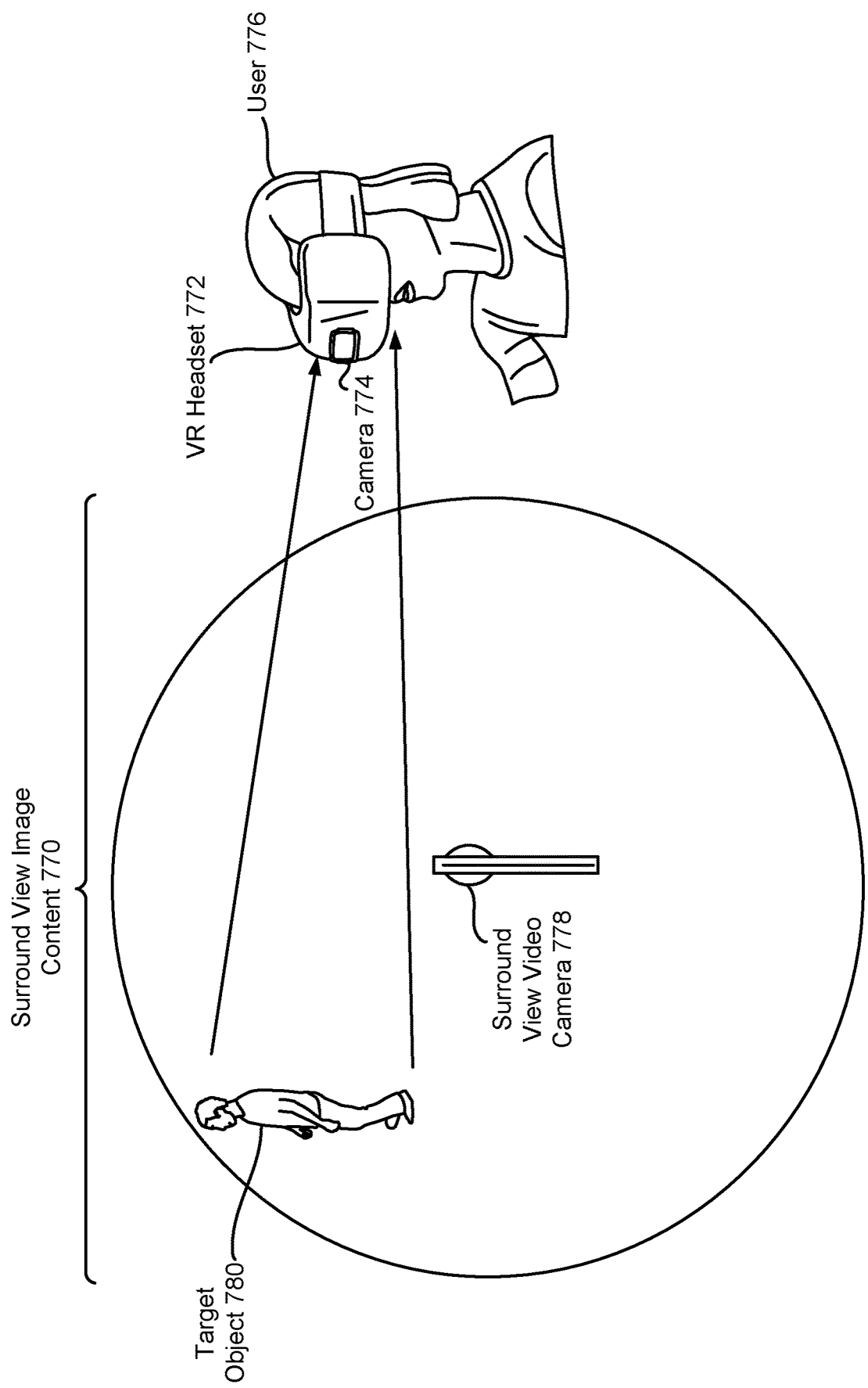
FIG. 7 is a diagram illustrating an example of a scenario for receiving reorientation input.

FIG. 7 is a diagram illustrating an example of a scenario for receiving reorientation input. In particular, FIG. 7 illustrates surround view image content 770 that depicts a target object 780 (e.g., a person) and a surround view video camera 778 (e.g., 360-degree camera) for capturing the surround view image content 770. The surround view image content 770 may be presented on a VR headset 772 worn by a user 776. For example, the surround view image content 770 may be a scene captured (e.g., recorded) by a 360-degree camera. The user 776 may see the target object 780 in the surround view image content (e.g., video). In this example, the VR headset 772 (e.g., a mobile device or smartphone in headset mounting) may include a camera 774 (e.g., a back camera on a mobile device) for capturing user gestures that may be recognized.

Figure 8:
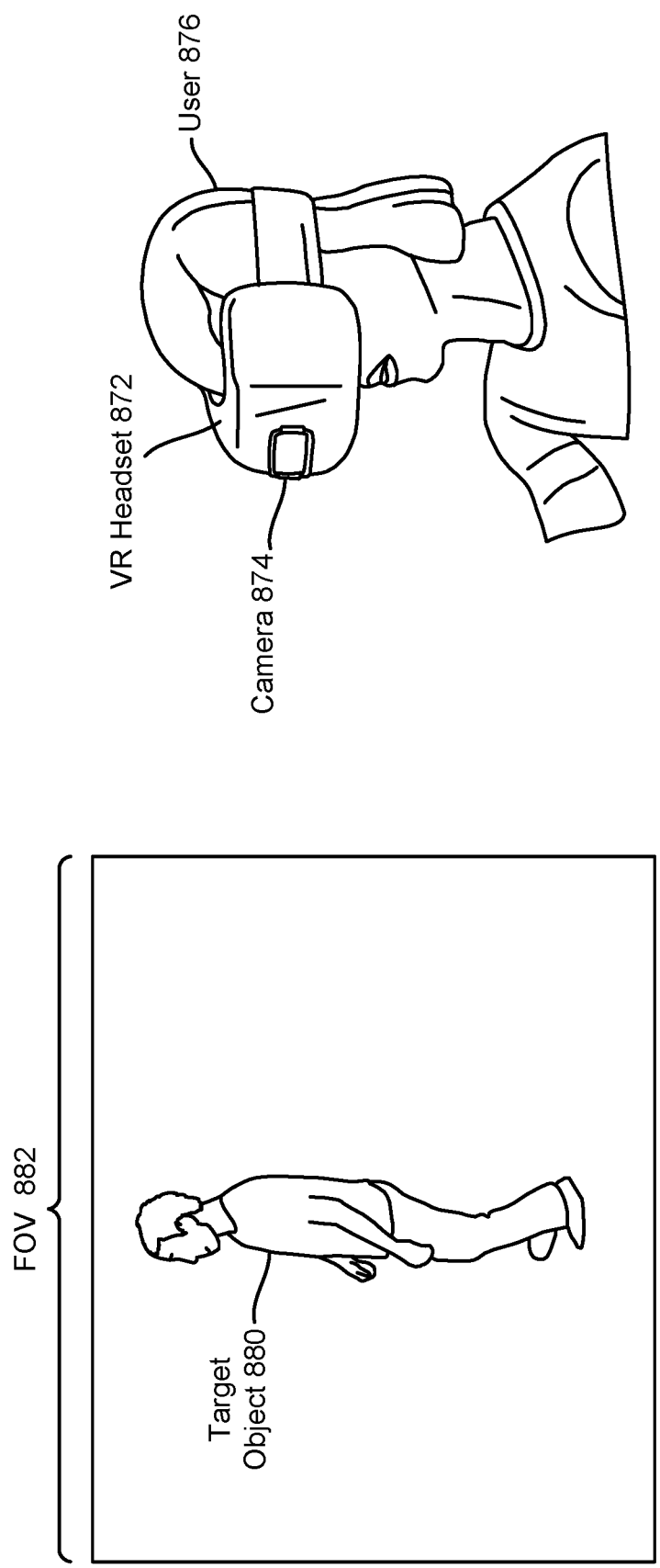
FIG. 8 is a diagram illustrating more detail of the example described in connection with FIG. 7.

FIG. 8 is a diagram illustrating more detail of the example described in connection with FIG. 7. In particular, FIG. 8 illustrates an FOV 882 of the surround view image content 770 (e.g., the scene) described in connection with FIG. 7. For example, the user 876 may see the FOV 882 in the VR headset 872 (e.g., player). The FOV 882 includes the target object 880 (e.g., a person). As described in connection with FIG. 7, the VR headset 872 may include a camera 874 for capturing user gestures that may be recognized. Further detail regarding gesture capture and/or recognition is given in connection with FIGS. 9-10.

Figure 9:
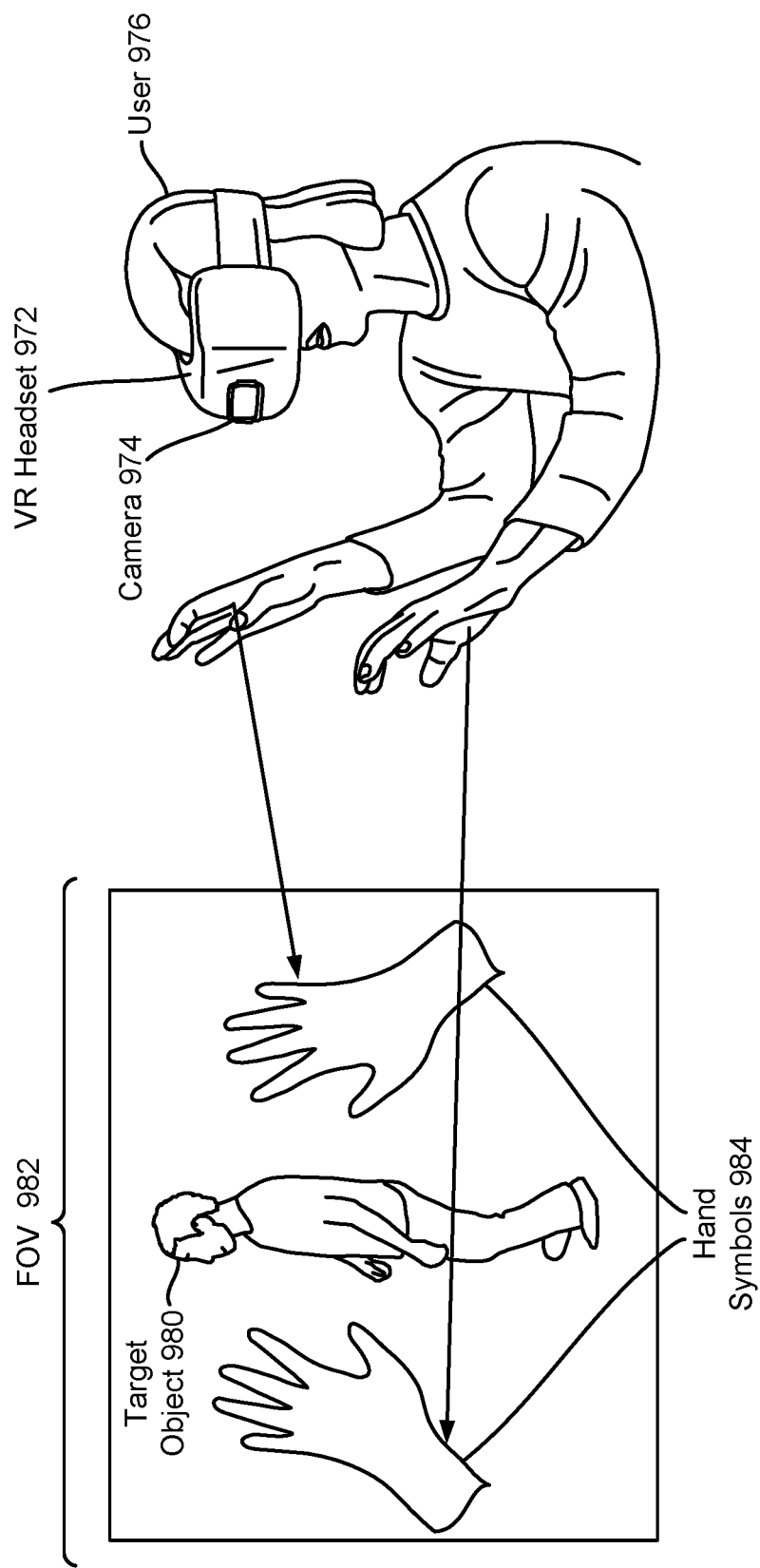
FIG. 9 is a diagram illustrating an example of capturing gestures in accordance with some configurations of the systems and methods disclosed herein.

FIG. 9 is a diagram illustrating an example of capturing gestures in accordance with some configurations of the systems and methods disclosed herein. In particular, FIG. 9 illustrates an FOV 982 of the surround view image content 770 described in connection with FIG. 7. For example, the user 976 may see the FOV 982 in the VR headset 972. The FOV 982 includes the target object 980 (e.g., a person). The VR headset 972 may include a camera 974 (e.g., a back camera on a mobile device) for capturing user gestures that may be recognized. As illustrated in FIG. 9, the camera 974 may capture an image of the user's hands. The hands may be recognized (by an electronic device 102, for example) and hand symbols 984 (e.g., augmented hand symbols) may be presented in the surround view image content (e.g., in the FOV 982). For example, whenever the user 976 is interested in marking the target object 980 (e.g., the person) in the surround view image content, the user 976 may show her hands to the camera 974 of the VR headset 972.

Figure 10:
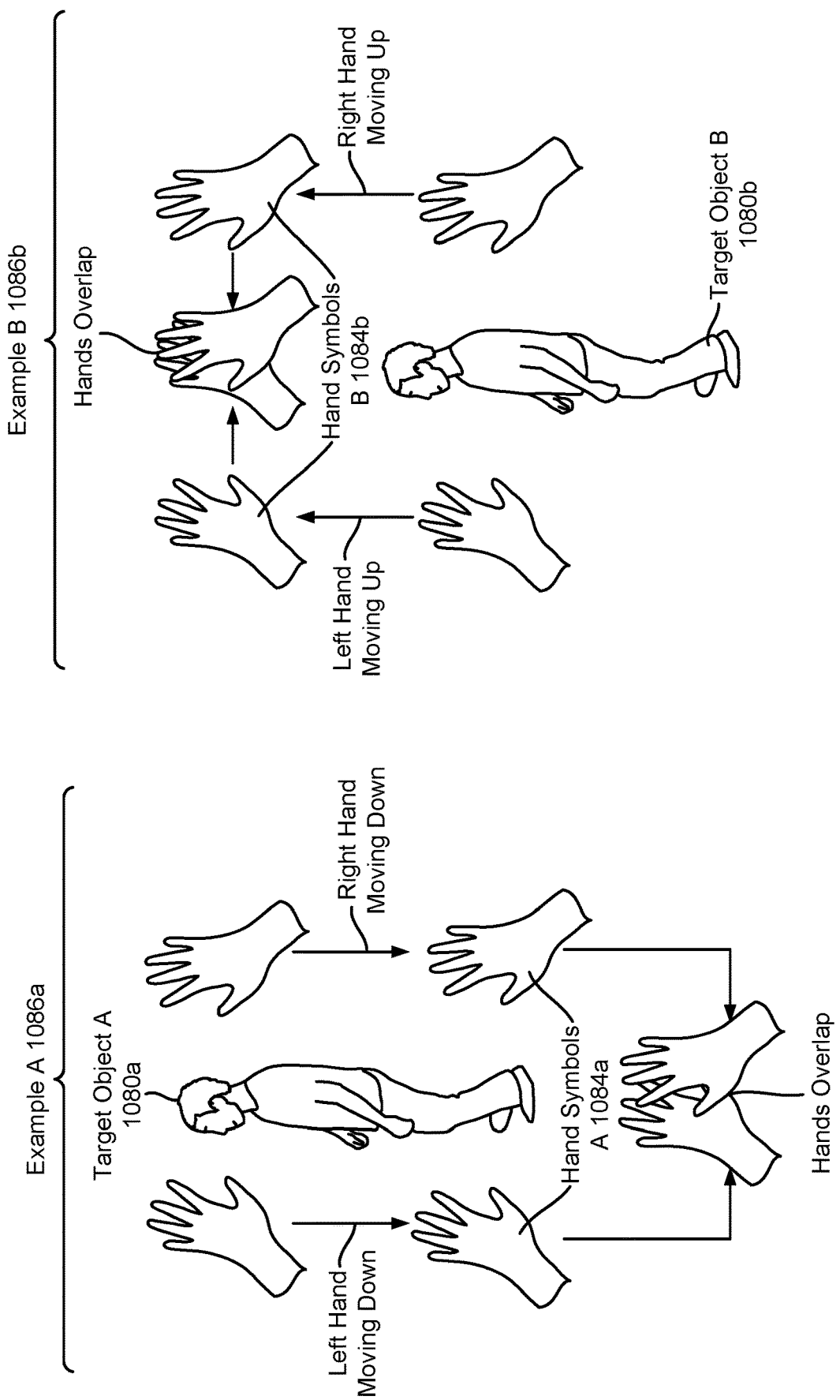
FIG. 10 is a diagram illustrating examples of gestures in accordance with some configurations of the systems and methods disclosed herein.

FIG. 10 is a diagram illustrating examples of gestures in accordance with some configurations of the systems and methods disclosed herein. In particular, FIG. 10 illustrates examples 1086a-b of FOVs depicting hand symbols 1084a-b moving in gesture patterns. Example A 1086a illustrates target object A 1080a (e.g., a person) and hand symbols A 1084a corresponding to user hands. For instance, hand symbols A 1084a (e.g., augmented hand symbols) may be presented on the surround view image content. In example A 1086a, the left hand moves downward and the right hand moves downward to overlap (e.g., combine) at the bottom. This may be considered a "u" shaped gesture that partially contains target object A 1080a. The gesture may be detected and used to indicate (e.g., mark) target object A 1080a (e.g., an ROI) for tracking such that the FOV may be reoriented according to the motion of target object A 1080a. For example, an electronic device (e.g., electronic device 102) may determine an ROI based on the hand gesture in the VR content.

Example B 1086b illustrates target object B 1080b (e.g., a person) and hand symbols B 1084b corresponding to user hands. For instance, hand symbols B 1084b (e.g., augmented hand symbols) may be presented on the surround view image content. In example B 1086b, the left hand moves upward and the right hand moves upward to overlap (e.g., combine) at the top. This may be considered an "n" shaped gesture that partially contains target object B 1080b. The gesture may be detected and used to de-indicate (e.g., unmark) target object B 1080b (e.g., an ROI) such that target object B 1080b is no longer tracked and the FOV may no longer be reoriented according to the motion of target object B 1080b. For example, an electronic device (e.g., electronic device 102) may unmark an ROI based on the hand gesture in the VR content.

In some configurations, computer vision and/or machine learning based algorithms may be utilized to recognize hand gestures using a back camera in a mobile device. Augmented reality hand graphics may follow user hand movements to determine an ROI (for recording the ROI and/or determining features of the ROI for recognition, for example). Whenever there is a change or motion in the selected ROI, the FOV may change accordingly. This may enhance the user experience by enabling consumption of surround view content (e.g., 360-degree videos, movies, etc.) without requiring a change in head position by choosing the ROI using hand gestures.

It should be noted that although FIG. 10 illustrates examples 1086a-b of hand gestures, additional or alternative gestures may be detected and/or utilized in accordance with the systems and methods disclosed herein. For example, gestures using a single hand and/or different gesture patterns may be utilized. Additionally or alternatively, different hand shapes and/or motions (e.g., pointing, closed fist, two raised fingers, thumbs up, etc.) may be utilized. Additionally or alternatively, one or more tools (e.g., controllers, wands, pointers, motion sensors, etc.) may be utilized to capture and/or recognize gestures.

Figure 11:
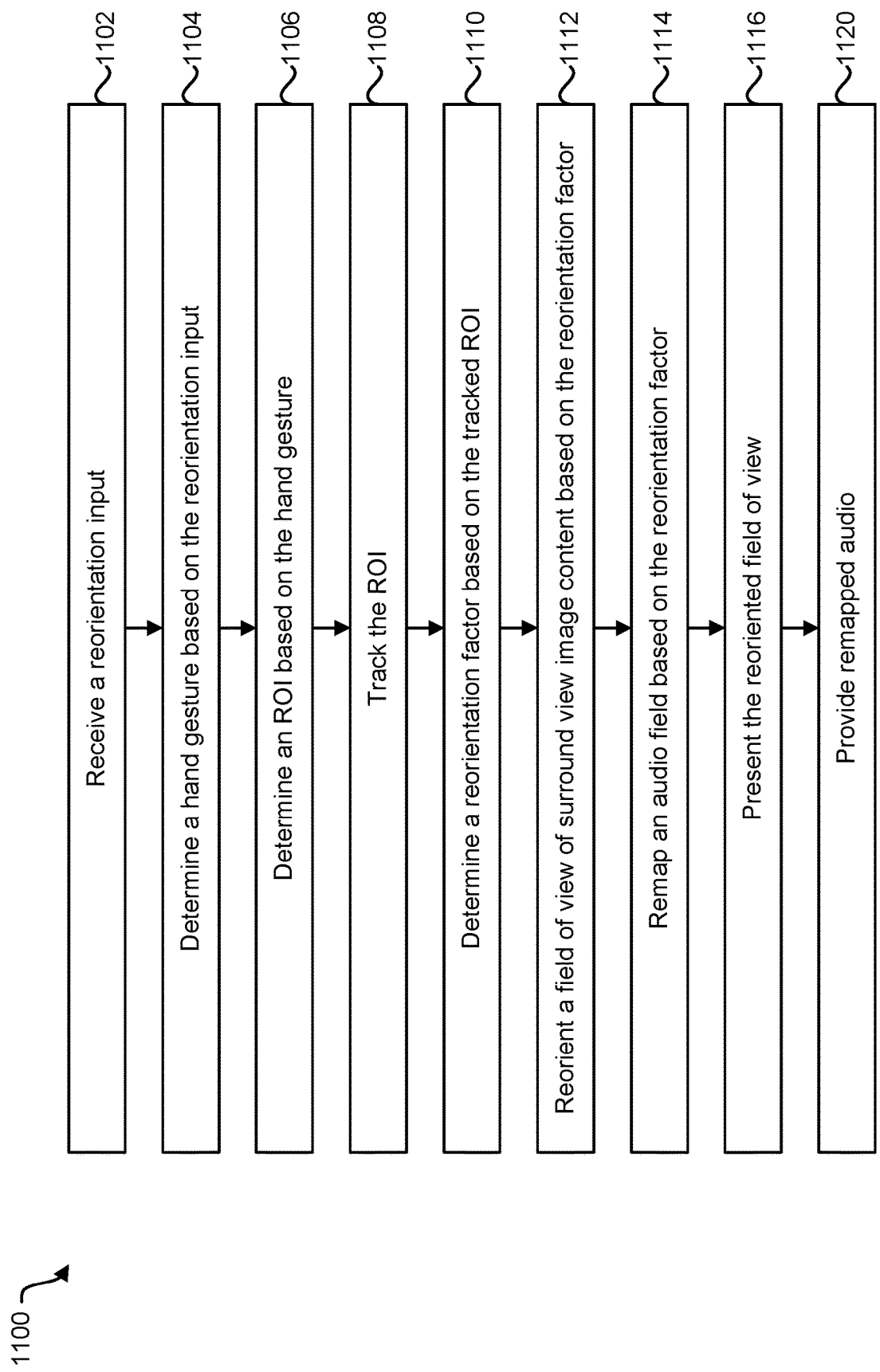
FIG. 11 is a flow diagram illustrating a more specific configuration of a method for controlling an FOV.

FIG. 11 is a flow diagram illustrating a more specific configuration of a method 1100 for controlling a field of view (FOV). The method 1100 may be performed by the electronic device 102 described in connection with FIG. 1, for example. The electronic device 102 may receive 1102 a reorientation input. This may be accomplished as described in connection with one or more of FIGS. 1-2 and/or 7-10. For example, the electronic device 102 may receive one or more images of user hands from one or more cameras (e.g., mobile device back camera(s)).

The electronic device 102 may determine 1104 a hand gesture based on the reorientation input. This may be accomplished as described in connection with FIG. 1. For example, the electronic device 102 may recognize one or more hands in the images and may track the motion of the hand(s). The electronic device 102 may compare the motion of the hands to one or more predetermined motions. In a case that the motion of the hands matches (within some range of variability, for example) a predetermined motion, the electronic device 102 may recognize the motion as the predetermined motion (e.g., an indicator of an ROI).

The electronic device 102 may determine 1106 an ROI based on the hand gesture. This may be accomplished as described in connection with one or more of FIGS. 1-2 and/or 10. For example, the electronic device 102 may determine a location and/or size of an ROI based on the hand gesture. In some configurations, the electronic device 102 may determine an object relative to (e.g., partially or fully enclosed by) the hand gesture and may determine an ROI that bounds the object. In some configurations, the electronic device 102 may determine an ROI with a size and/or shape corresponding to the hand gesture (e.g., the hand gesture pattern and/or location). For instance, the ROI may be a region enclosed by the hand gesture. In some configurations, the ROI may correspond to a bounding box of a detected object (e.g., detected face, person, or other object).

The electronic device 102 may track 1108 the ROI. This may be accomplished as described in connection with FIG. 1. For example, the electronic device 102 may track the ROI from frame to frame (e.g., image-to-image) of the surround view image content.

The electronic device 102 may determine 1110 a reorientation factor based on the tracked ROI. This may be accomplished as described in connection with FIG. 1. For example, the electronic device 102 may determine the location (e.g., rotation vector) of the tracked ROI (e.g., ROI center) in the surround view image content. The reorientation factor may indicate an amount and/or direction of movement (e.g., rotation and/or translation) to move the FOV to the ROI. In some configurations, the reorientation factor may be a rotational difference (in yaw, pitch, and roll, for example) between the ROI center and a forward axis of the surround view image content coordinate system. In some configurations, the reorientation factor may be a rotational difference between the current FOV center and the ROI.

The electronic device 102 may reorient 1112 an FOV of surround view image content based on the reorientation factor. This may be accomplished as described in connection with one or more of FIGS. 1 and/or 2. For example, the electronic device 102 may rotate and/or translate the FOV (or FOV anchor) based on the reorientation factor.

The electronic device 102 may remap 1114 an audio field based on the reorientation factor. This may be accomplished as described in connection with one or more of FIGS. 1 and 6. For example, the electronic device 102 may rotate the audio field and/or may remap audio signals (e.g., microphones) to output channels (e.g., speakers) such that the audio field corresponds with the reoriented FOV. For instance, the electronic device 102 may adjust audio phase (e.g., audio channel timing) to remap the audio field.

The electronic device 102 may present 1116 the reoriented FOV. This may be accomplished as described in connection with one or more of FIGS. 1 and/or 2.

The electronic device 102 may provide 1120 remapped audio. This may be accomplished as described in connection with FIG. 1. For example, the electronic device 102 may output the remapped audio to one or more speakers (e.g., headphones, ear buds, loudspeakers, etc.). Additionally or alternatively, the electronic device 102 may send the remapped audio to another device for output.

It should be noted that one or more steps of the method 1100 may be rearranged and/or omitted in some configurations. Additionally or alternatively, one or more steps of the method 1100 may be substituted with one or more other configurations, approaches, and/or examples described herein. For example, determining 1106 the ROI may be based on a speech input (e.g., "device, track so-and-so").

Figure 12:
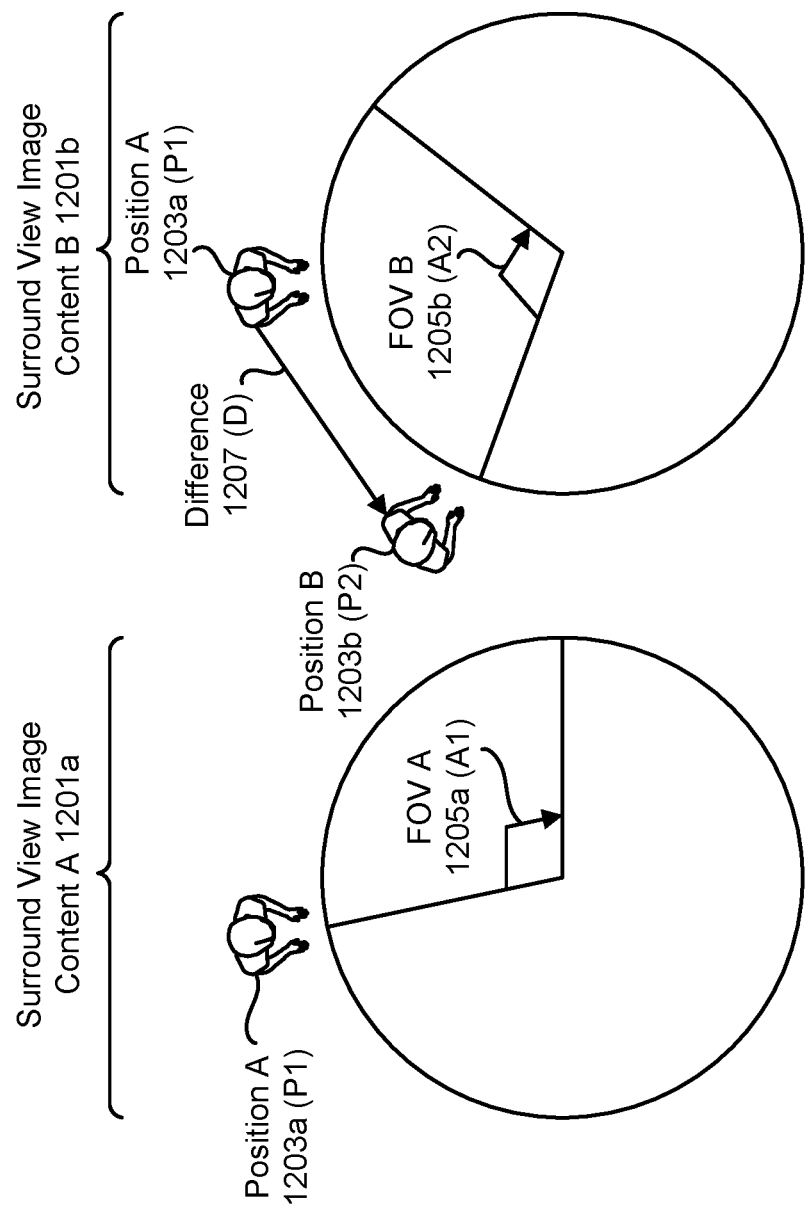
FIG. 12 is a diagram illustrating an example of determining a reorientation factor and/or reorienting a FOV.

FIG. 12 is a diagram illustrating an example of determining a reorientation factor and/or reorienting a FOV. In particular, FIG. 12 illustrates one example of a mathematical representation of the display FOV based on user position. In FIG. 12, surround view image content A 1201a and surround view image content B 1201b are illustrated. As illustrated in FIG. 12, position A 1203a ("P1") is the initial position of a person and position B 1203b ("P2") is a subsequent (e.g., new) position. FOV A 1205a ("A1") is the initial display FOV. It should be noted that in some examples, the horizontal FOV angular range may be 110 degrees in VR headsets. For instance, the initial display FOV angular range (e.g., size) may be constant based on the VR device. An FOV angular range of 110 degrees or other FOV angular ranges may be implemented in accordance with the systems and methods disclosed herein. FOV B 1205b ("A2") may be the new FOV based on position B 1203b (P2), which may be away from FOV A 1205a (A1).

In some approaches, position A 1203a (P1) may be represented as P1=2*π*r(A1/360), where r is the radius of the surround view image content. Position B 1203b (P2) may be represented as P2=2*π*r(A2/360). The difference 1207 between position A 1203a (P1) and position B 1203b (P2) may be identified using motion detection (e.g., ROI tracking) and may be represented as (e.g., stored as) D=(P2−P1) and/or P2=P1+D.

In some approaches, position B 1203b (P2) (e.g., the new position P2=(P1+D)) may be represented as P=(P1+D)=

(2*π*r(A2/360)). The new angle for FOV B 1205b (A2) may be determined based on P1, D, and r values. For example, A2=((P1+D)*360)/(2*π*r).

In some configurations, a delta angle may be an example of the reorientation factor. For instance, an electronic device 102 may determine the reorientation factor based on the reorientation input (e.g., based on tracking an object). In some approaches, the delta angle (DA) may be determined as DA=A2−A1. The delta angle may be applied to an initial display FOV to reorient the FOV. For example, reorienting the FOV may move the FOV to follow the person to position B 1203b (P2). For instance, the delta angle may be added to the initial display FOV (A1) (e.g., new FOV=Initial FOV (A1)+DA(Delta Angle).

It should be noted that the approach described in connection with FIG. 12 may address yaw (e.g., rotation about z). In some configurations, the motion vector between the two positions (e.g., position A 1203a (P1) position B 1203b (P2)) may determine the delta angle (DA) to be applied in one or more directions (e.g., yaw (rotation), pitch and/or roll) to the initial FOV angle (e.g., center FOV angle, FOV coordinates, etc.). It should be noted that for some video conversation use cases, the new FOV may be applied to yaw (e.g., rotation), which may follow the position of a person, for example. In some configurations, one or more of the functions, operations, and/or calculations described in connection with FIG. 12 may be performed in one or more of the methods 200, 1100 disclosed herein.

Figure 13:
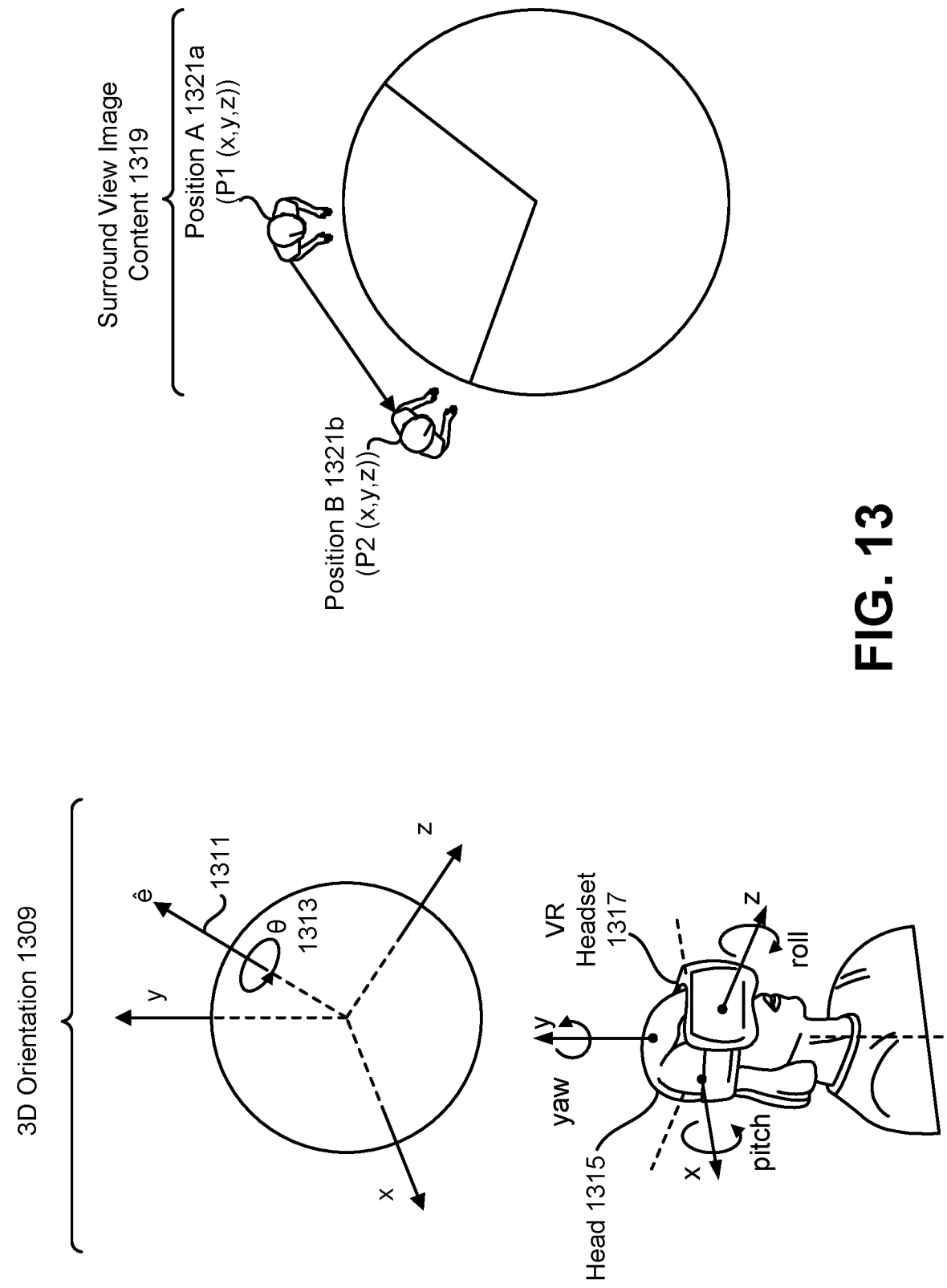
FIG. 13 is a diagram illustrating another example of determining a reorientation factor and/or reorienting an FOV.

FIG. 13 is a diagram illustrating another example of determining a reorientation factor and/or reorienting an FOV. In particular, FIG. 13 illustrates an example of FOV reorientation in three dimensions (e.g., from an initial x, y, z of the FOV in 3D space coordinates to an FOV in a reoriented position). In some approaches, three-dimensional (3D) orientation may be represented in accordance with one or more aspects of the following.

In FIG. 13, an example of a 3D orientation 1309 is illustrated. Every 3D orientation may be described by a rotation of theta (θ) 1313 (in degrees or radians, for example) about some axis 1311 that intersects the origin. In some approaches for a VR headset 1317, a rotating head 1315 may be considered as a spinning top that changes speed and/or axis. Motion estimation (e.g., motion detection) of the VR headset 1317 may provide angular velocity with respect to roll, pitch, and yaw, producing a 3D vector (wx, wy, wz). The 3D vector may be an example of a reorientation factor.

In some approaches, an electronic device (e.g., electronic device 102) may utilize one or more of the following equations for calculating the rotation.

$$\text{Quaternion}_{Current} = \text{Quaternion}_{Previous} * Q_{Unit}(\text{axis, angle}) \quad (1)$$

In Equation (1), Quaternion$_{Current}$ is a quaternion (e.g., orientation) at a current time (e.g., at a current time frame, current discrete time, etc.), Quaternion$_{Previous}$ is a quaternion at a previous time (e.g., previous time frame), and $Q_{Unit}$(axis, angle) is a unit quaternion. For example, $Q_{Unit}$(axis, angle) may denote a unit quaternion that represents rotation by an angle about the given axis. Unit quaternions may be used for ease of conversion to and from an axis-angle description and/or because the multiplication operation for unit quaternions may combine orientations in a way that is equivalent to multiplying out corresponding 3 by 3 rotation matrices. It should be noted that numerical singularity issues associated with yaw, pitch, and/or roll angles may be avoided in some approaches.

In some configurations, rotation (e.g., reorientation) may be carried out in accordance with Equation (2).

$$P2 = P1 * Q_{Vec} \quad (2)$$

In Equation (2), P2 is a second position, P1 is a first position, and $Q_{Vec}$ is a quaternion representing the 3D vector (wx, wy, wz). FIG. 13 illustrates an example of surround view image content 1319 from a top-down perspective, where position A 1321a is an example of P1 and position B 1321b is an example of P2.

In some configurations, an electronic device 102 may convert the 3D vector into a quaternion $Q_{Vec}$. To convert the 3D vector, the imaginary parts of the quaternion may be set to the x, y, and z values of the vector. In some approaches, $Q_{Vec}$ may not be normalized like the quaternion representing the rotation (e.g., $Q_{Unit}$(axis, angle)). In some configurations, the conversion may be performed in accordance with Equation (3).

$$Q_{Vec} = \cos(\theta/2) + i(x^*\sin(\theta/2)) + j(y^*\sin(\theta/2)) + k(z^*\sin(\theta/2)) \quad (3)$$

In Equation (3), each of i, j, and k are unit vectors representing respective axes (e.g., three Cartesian axes). Accordingly, the vector (wx, wy, wz) may be taken as the rotation axis. In some configurations, the vector length may be the angular speed of rotation about that axis. In some configurations, one or more of the functions, operations, and/or calculations described in connection with FIG. 13 may be performed in one or more of the methods 200, 1100 disclosed herein.

Figure 14:
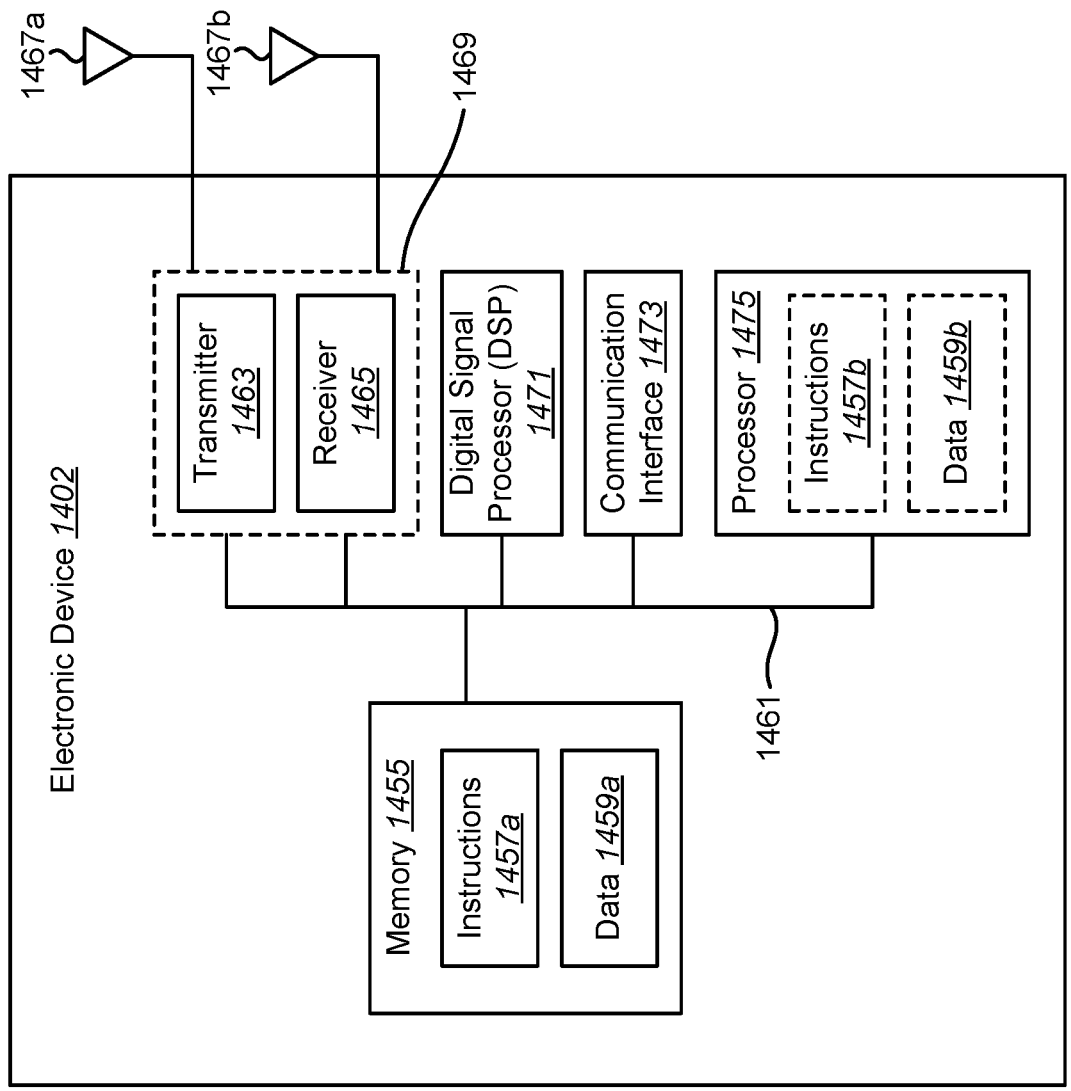
FIG. 14 illustrates certain components that may be included within an electronic device.

FIG. 14 illustrates certain components that may be included within an electronic device 1402. The electronic device 1402 may be an example of and/or may be implemented in accordance with the electronic device 102 described in connection with FIG. 1. The electronic device 1402 may be (or may be included within) a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1402 includes a processor 1475. The processor 1475 may be a general purpose single- or multi-chip microprocessor (e.g., an ARM), a special purpose microprocessor (e.g., a digital signal processor (DSP)), a microcontroller, a programmable gate array, etc. The processor 1475 may be referred to as a central processing unit (CPU). Although just a single processor 1475 is shown in the electronic device 1402, in an alternative configuration, a combination of processors (e.g., an ARM and DSP) could be used.

The electronic device 1402 also includes memory 1455. The memory 1455 may be any electronic component capable of storing electronic information. The memory 1455 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1459a and instructions 1457a may be stored in the memory 1455. The instructions 1457a may be executable by the processor 1475 to implement one or more of the methods 200, 1100, functions, and/or operations described herein. Executing the instructions 1457a may involve the use of the data 1459*a* that is stored in the memory 1455. When the processor 1475 executes the instructions 1457, various portions of the instructions 1457*b* may be loaded onto the processor 1475, and various pieces of data 1459*b* may be loaded onto the processor 1475.

The electronic device 1402 may also include a transmitter 1463 and a receiver 1465 to allow transmission and reception of signals to and from the electronic device 1402. The transmitter 1463 and receiver 1465 may be collectively referred to as a transceiver 1469. One or multiple antennas 1467*a-b* may be electrically coupled to the transceiver 1469. The electronic device 1402 may also include (not shown) multiple transmitters, multiple receivers, multiple transceivers and/or additional antennas.

The electronic device 1402 may include a digital signal processor (DSP) 1471. The electronic device 1402 may also include a communication interface 1473. The communication interface 1473 may enable one or more kinds of input and/or output. For example, the communication interface 1473 may include one or more ports and/or communication devices for linking other devices to the electronic device 1402. Additionally or alternatively, the communication interface 1473 may include one or more other interfaces (e.g., touchscreen, keypad, keyboard, microphone, camera, etc.). For example, the communication interface 1473 may enable a user to interact with the electronic device 1402.

The various components of the electronic device 1402 may be coupled together by one or more buses, which may include a power bus, a control signal bus, a status signal bus, a data bus, etc. For the sake of clarity, the various buses are illustrated in FIG. 14 as a bus system 1461.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims. It should be noted that one or more steps, actions, or elements of one configuration may be combined with and/or substituted for one or more steps, actions, or elements of another configuration. Additionally or alternatively, one or more steps, actions, or elements may be omitted from some configurations.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, comprising:
   receiving surround view image content;
   orienting a first field of view (FOV) of the surround view image content relative to an FOV anchor corresponding to a coordinate system of the surround view image content;
   receiving a reorientation input, the reorientation input indicating a region of interest (ROI) of the surround view image content;
   determining a reorientation factor based on the reorientation input, wherein the reorientation factor comprises a difference vector indicating an amount of movement and a direction between a forward axis of the coordinate system and the ROI indicated by the reorientation input;
   reorienting the FOV anchor to the ROI based on the reorientation factor determined based on the reorientation input indicating the ROI;
   reorienting the first FOV to a second FOV of the surround view image content relative to the coordinate system based on reorienting the FOV anchor to the ROI based on the reorientation factor, wherein the second FOV is oriented differently from the FOV anchor; and
   presenting the second FOV.

2. The method of claim 1, wherein reorienting the first FOV is based on a real-world orientation of the electronic device.

3. The method of claim 2, wherein reorienting the first FOV is based on the real-world orientation of the electronic device relative to the coordinate system of the surround view image content.

4. The method of claim 1, wherein determining the reorientation factor comprises:
   determining a target field of view based on the reorientation input; and
   determining the reorientation factor based on the target field of view.

5. The method of claim 1, wherein determining the reorientation factor comprises:
   determining the ROI based on the reorientation input;
   tracking the ROI; and
   determining the reorientation factor based on the tracked ROI.

6. The method of claim 1, wherein determining the reorientation factor comprises:
   determining an audio direction based on the reorientation input; and
   determining the reorientation factor based on the audio direction.

7. The method of claim 1, wherein determining the reorientation factor comprises:
   determining at least one hand gesture based on the reorientation input;
   determining the ROI based on the at least one hand gesture; and
   determining the reorientation factor based on the ROI.

8. The method of claim 1, further comprising remapping an audio field based on the reorientation factor.

9. An electronic device, comprising:
   a memory; and
   a processor coupled to the memory, wherein the processor is configured to:
   receive surround view image content;
   orient a first field of view (FOV) of the surround view image content relative to an FOV anchor corresponding to a coordinate system of the surround view image content;
   receive a reorientation input, the reorientation input indicating a region of interest (ROI) of the surround view image content;
   determine a reorientation factor based on the reorientation input, wherein the reorientation factor comprises a difference vector indicating an amount of movement and a direction between a forward axis of the coordinate system and the ROI indicated by the reorientation input;
   reorient the FOV anchor to the ROI based on the reorientation factor determined based on the reorientation input indicating the ROI;
   reorient the first FOV to a second FOV of the surround view image content relative to the coordinate system based on reorienting the FOV anchor to the ROI based on the reorientation factor, wherein the second FOV is oriented differently from the FOV anchor; and
   present the second FOV.

10. The electronic device of claim 9, wherein the processor is configured to reorient the first FOV based on a real-world orientation of the electronic device.

11. The electronic device of claim 10, wherein the processor is configured to reorient the first FOV based on the real-world orientation of the electronic device relative to the coordinate system of the surround view image content.

12. The electronic device of claim 9, wherein the processor is configured to:
   determine a target field of view based on the reorientation input; and
   determine the reorientation factor based on the target field of view.

13. The electronic device of claim 9, wherein the processor is configured to:
   determine the ROI based on the reorientation input;
   track the ROI; and
   determine the reorientation factor based on the tracked ROI.

14. The electronic device of claim 9, wherein the processor is configured to:
- determine an audio direction based on the reorientation input; and
- determine the reorientation factor based on the audio direction.

15. The electronic device of claim 9, wherein the processor is configured to:
- determine at least one hand gesture based on the reorientation input;
- determine the ROI based on the at least one hand gesture; and
- determine the reorientation factor based on the ROI.

16. The electronic device of claim 9, wherein the processor is configured to remap an audio field based on the reorientation factor.

17. A non-transitory tangible computer-readable medium storing computer executable code, comprising:
- code for causing an electronic device to receive surround view image content;
- code for causing the electronic device to orient a first field of view (FOV) of the surround view image content relative to an FOV anchor corresponding to a coordinate system of the surround view image content;
- code for causing the electronic device to receive a reorientation input, the reorientation input indicating a region of interest (ROI) of the surround view image content;
- code for causing the electronic device to determine a reorientation factor based on the reorientation input, wherein the reorientation factor comprises a difference vector indicating an amount of movement and a direction between a forward axis of the coordinate system and the ROI indicated by the reorientation input;
- code for causing the electronic device to reorient the FOV anchor to the ROI based on the reorientation factor determined based on the reorientation input indicating the ROI;
- code for causing the electronic device to reorient the first FOV to a second FOV of the surround view image content relative to the coordinate system based on reorienting the FOV anchor to the ROI based on the reorientation factor, wherein the second FOV is oriented differently from the FOV anchor; and
- code for causing the electronic device to present the second FOV.

18. The computer-readable medium of claim 17, wherein the code for causing the electronic device to reorient the first FOV is based on a real-world orientation of the electronic device.

19. The computer-readable medium of claim 18, wherein the code for causing the electronic device to reorient the first FOV is based on the real-world orientation of the electronic device relative to the coordinate system of the surround view image content.

20. The computer-readable medium of claim 17, wherein the code for causing the electronic device to determine the reorientation factor comprises:
- code for causing the electronic device to determine a target field of view based on the reorientation input; and
- code for causing the electronic device to determine the reorientation factor based on the target field of view.

21. The computer-readable medium of claim 17, wherein the code for causing the electronic device to determine the reorientation factor comprises:
- code for causing the electronic device to determine the ROI based on the reorientation input;
- code for causing the electronic device to track the ROI; and
- code for causing the electronic device to determine the reorientation factor based on the tracked ROI.

22. The computer-readable medium of claim 17, wherein the code for causing the electronic device to determine the reorientation factor comprises:
- code for causing the electronic device to determine an audio direction based on the reorientation input; and
- code for causing the electronic device to determine the reorientation factor based on the audio direction.

23. The computer-readable medium of claim 17, wherein the code for causing the electronic device to determine the reorientation factor comprises:
- code for causing the electronic device to determine at least one hand gesture based on the reorientation input;
- code for causing the electronic device to determine the ROI based on the at least one hand gesture; and
- code for causing the electronic device to determine the reorientation factor based on the ROI.

24. An apparatus, comprising:
- means for receiving surround view image content;
- means for orienting a first field of view (FOV) of the surround view image content relative to an FOV anchor corresponding to a coordinate system of the surround view image content;
- means for receiving a reorientation input, the reorientation input indicating a region of interest (ROI) of the surround view image content;
- means for determining a reorientation factor based on the reorientation input, wherein the reorientation factor comprises a difference vector indicating an amount of movement and a direction between a forward axis of the coordinate system and the ROI indicated by the reorientation input;
- means for reorienting the FOV anchor to the ROI based on the reorientation factor determined based on the reorientation input indicating the ROI;
- means for reorienting the first FOV to a second FOV of the surround view image content relative to the coordinate system based on reorienting the FOV anchor to the ROI based on the reorientation factor, wherein the second FOV is oriented differently from the FOV anchor; and
- means for presenting the second FOV.

25. The apparatus of claim 24, wherein the means for reorienting the first FOV is based on a real-world orientation of the apparatus.

26. The apparatus of claim 25, wherein the means for reorienting the first FOV is based on the real-world orientation of the apparatus relative to the coordinate system of the surround view image content.

27. The apparatus of claim 24, wherein the means for determining the reorientation factor comprises:
- means for determining a target field of view based on the reorientation input; and
- means for determining the reorientation factor based on the target field of view.

28. The apparatus of claim 24, wherein the means for determining the reorientation factor comprises:
- means for determining the ROI based on the reorientation input;
- means for tracking the ROI; and
- means for determining the reorientation factor based on the tracked ROI.

29. The apparatus of claim 24, wherein the means for determining the reorientation factor comprises:

means for determining an audio direction based on the reorientation input; and means for determining the reorientation factor based on the audio direction.

30. The apparatus of claim 24, wherein the means for determining the reorientation factor comprises:

means for determining at least one hand gesture based on the reorientation input;

means for determining the ROI based on the at least one hand gesture; and means for determining the reorientation factor based on the ROI.

31. The method of claim 1, wherein the ROI is determined based on machine learning.

* * * * *